(12) United States Patent
Yamada et al.

(10) Patent No.: US 8,653,753 B2
(45) Date of Patent: Feb. 18, 2014

(54) PROJECTION-TYPE IMAGE DISPLAY APPARATUS, LIGHTING APPARATUS AND LIGHTING METHOD REALIZING AN EXTENDED LIFETIME

(75) Inventors: Go Yamada, Osaka (JP); Syunsuke Ono, Osaka (JP)

(73) Assignee: Panasonic Corporation, Osaka (JP)

( * ) Notice: Subject to any disclaimer, the term of this patent is extended or adjusted under 35 U.S.C. 154(b) by 1008 days.

(21) Appl. No.: 12/244,653

(22) Filed: Oct. 2, 2008

(65) Prior Publication Data

US 2009/0091272 A1    Apr. 9, 2009

(30) Foreign Application Priority Data

Oct. 5, 2007 (JP) .................. 2007-261799

(51) Int. Cl.
*H05B 37/02* (2006.01)
(52) U.S. Cl.
USPC ............................ 315/307; 315/291; 315/224
(58) Field of Classification Search
USPC ..................... 315/307, 308, 291, 224, 225
See application file for complete search history.

(56) References Cited

U.S. PATENT DOCUMENTS

| | | | | |
|---|---|---|---|---|
| 6,545,430 B2* | 4/2003 | Ono et al. | ...................... | 315/291 |
| 6,794,832 B2* | 9/2004 | Yamamoto et al. | ........... | 315/307 |
| 6,943,503 B2* | 9/2005 | Ozasa et al. | .................. | 315/224 |
| 6,979,960 B2* | 12/2005 | Okawa et al. | .................. | 315/291 |
| 7,688,003 B2* | 3/2010 | Yamada et al. | ............... | 315/291 |
| 2004/0090184 A1* | 5/2004 | Arimoto et al. | .................. | 315/59 |
| 2005/0184681 A1* | 8/2005 | Gordin et al. | .................. | 315/291 |
| 2006/0022613 A1* | 2/2006 | Suzuki et al. | .................. | 315/291 |
| 2007/0164687 A1* | 7/2007 | Watanabe et al. | ............. | 315/291 |

FOREIGN PATENT DOCUMENTS

| | | |
|---|---|---|
| JP | 2000-28988 | 1/2000 |
| JP | 2004-134176 | 4/2004 |
| JP | 2005-209572 | 8/2005 |
| JP | 2005-251722 | 9/2005 |
| JP | 2006-173022 | 6/2006 |
| JP | 2007-213922 | 8/2007 |

\* cited by examiner

*Primary Examiner* — Douglas W. Owens
*Assistant Examiner* — Amy Yang

(57) ABSTRACT

A projection-type image display apparatus includes a high pressure discharge lamp, which utilizes the halogen cycle, and a lamp lighting apparatus that controls lighting of the high pressure discharge lamp. The lamp lighting apparatus performs lamp refresh processing to improve a lamp property. The lamp refresh processing involves performing low power lighting of the high pressure discharge lamp by changing the lighting power of the high pressure discharge lamp to a value that is lower than the rated power, and thereafter performing high power lighting of the high pressure discharge lamp by changing the lighting power to a value that is higher than the lighting power during the low power lighting.

11 Claims, 25 Drawing Sheets

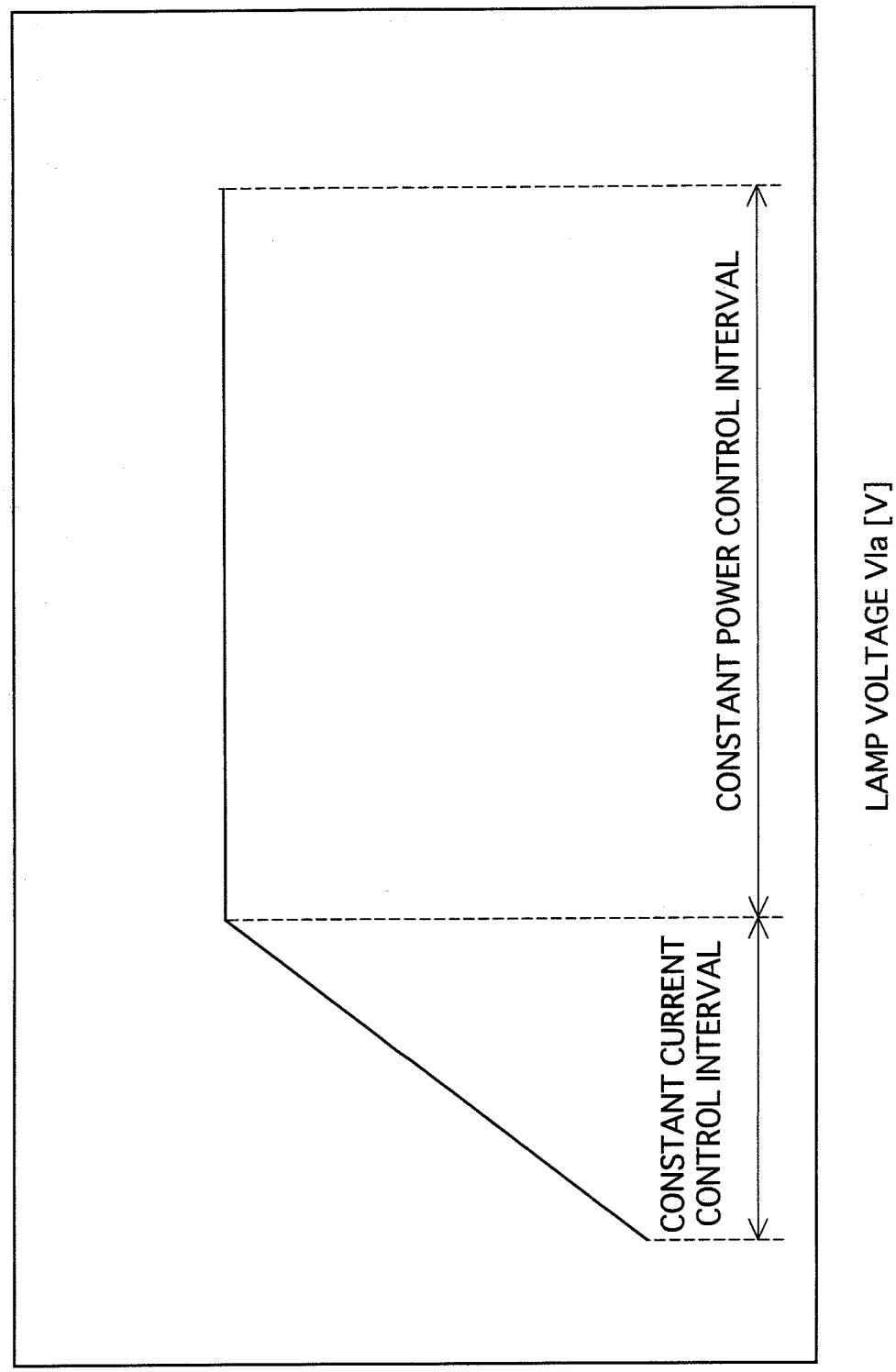

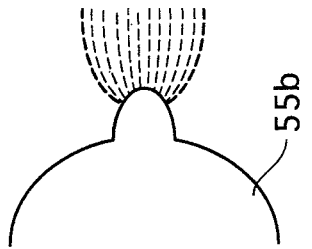
FIG.5A BEFORE PROCESSING
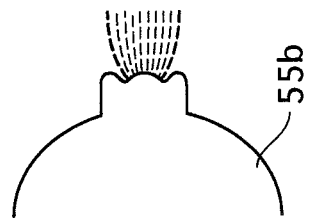
FIG.5B LOW POWER LIGHTING
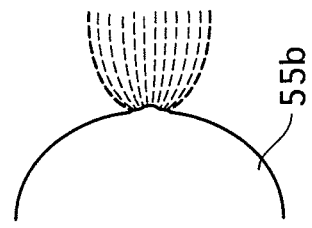
FIG.5C HIGH POWER LIGHTING

FIG.8

Ta: CONTROL PATTERN TABLE

| LIGHTING PATTERN | | LIGHTING POWER | LIGHTING FREQUENCY | FLIP-UP RATE | TIME |
|---|---|---|---|---|---|
| RATED POWER LIGHTING | | W0 | f0 | H0 | — |
| LAMP REFRESH LIGHTING | LOW POWER LIGHTING | W1 | f1 | H1 | T1 |
| | HIGH POWER LIGHTING | W2 | f2 | H2 | T2 |

FIG.11

Ta: CONTROL PATTERN TABLE

| LIGHTING PATTERN | | LIGHTING POWER | LIGHTING FREQUENCY | FLIP-UP RATE | TIME |
|---|---|---|---|---|---|
| RATED POWER LIGHTING | | 165W | 170Hz | 110% | — |
| LAMP REFRESH LIGHTING | LOW POWER LIGHTING | 120W | 115Hz | 150% | 8 MIN |
| | HIGH POWER LIGHTING | 165W | 170Hz | 130% | 2 MIN |

165W LAMP (INITIAL LIFETIME STAGE)

BEFORE LAMP REFRESH PROCESSING

165W LAMP (INITIAL LIFETIME STAGE)

AFTER LAMP REFRESH PROCESSING

FIG.18

| LIGHTING PATTERN | | LIGHTING POWER | LIGHTING FREQUENCY | FLIP-UP RATE | TIME |
|---|---|---|---|---|---|
| RATED POWER LIGHTING | | 200W | 115Hz | 110% | — |
| LAMP REFRESH LIGHTING | LOW POWER LIGHTING | 160W | 85Hz | 150% | 8 MIN |
| | HIGH POWER LIGHTING | 200W | 115Hz | 130% | 2 MIN |

BEFORE LAMP REFRESH PROCESSING

AFTER LAMP REFRESH PROCESSING

PROJECTION-TYPE IMAGE DISPLAY APPARATUS, LIGHTING APPARATUS AND LIGHTING METHOD REALIZING AN EXTENDED LIFETIME

This application is based on application No. 2007-261799 filed in Japan, the content of which is hereby incorporated by reference.

BACKGROUND OF THE INVENTION

1. Field of the Invention

The present invention relates to a projection-type image display apparatus using a high pressure discharge lamp as a light source, a lighting apparatus, and a lighting method.

2. Description of the Related Art

High pressure discharge lamps (hereinafter, simply called "lamps") used as light sources in projection-type image display apparatuses include a discharge container, a light-emitting material enclosed in a discharge space in the discharge container, and a pair of electrodes provided such that the ends thereof oppose each other in the discharge space. In addition to the light-emitting material, a halide is enclosed in the discharge space, and the halogen cycle that occurs during sustained lighting is used to suppress the consumption of the electrodes. In such lamps, electrode material evaporates off of the electrode tips due to the heat load from the discharge arc, and in the halogen cycle, the evaporated electrode material returns to the electrode tips.

In such lamps that use the halogen cycle, it is necessary to create a proper condition for the halogen cycle that occurs during sustained lighting to function effectively. In order to achieve this, various lighting control patterns including combinations of lighting power, lighting frequency (i.e., current frequency) and lighting current waveform applied to the lamps have been determined, the amount of mercury, halides and the like enclosed in the discharge space has been determined, the distance between the electrodes has been determined, etc. Note that tungsten is often used as the electrode material.

As the cumulative time for which lamp lighting has been sustained (hereinafter, called the "cumulative lighting time") increases, the amount of electrode material that evaporates becomes greater than the amount of electrode material that returns due to the halogen cycle, as a result of which the electrodes gradually recede (i.e., are consumed), the interelectrode distance increases, and the position of the discharge arc shifts.

An increase in interelectrode distance and a shift in the position of the discharge arc cause a shift away from the position relative to the reflecting mirror that is set based on the original interelectrode distance, and this shift in position relative to the reflecting mirror causes the reflecting effectiveness to attenuate. As a result, the screen illuminance decreases and lamp lifetime (determined to be reached when the illuminance is approximately 50% of the original illuminance) decreases.

Examples of technology for extending the lifetime of such lamps include performing lighting at a lighting power less than or equal to the rated power value during the initial lifetime stage (while the cumulative lighting time is short) (e.g., Japanese Patent Application Publication No. 2000-28988), and changing the frequency and the range in which the power varies (power amplitude) according to the lamp voltage during lamp lighting (e.g., Japanese Patent Application Publication No. 2005-209572).

However, although continually or periodically performing lighting at a low power according to the above technology reduces the heat load on the lamp and realizes and extended lamp lifetime, it is hard to say that a sufficient brightness is ensured during operation of the lamp at the rated power.

SUMMARY OF THE INVENTION

The present invention has been achieved in light of the above issues, and an aim thereof is to provide a projection-type image display apparatus, a lighting apparatus and a lighting method that ensure a sufficient brightness during lamp operation at rated power, while also achieving an extended lamp lifetime.

Upon examining the above issues, the inventors of the present invention discovered that varying the lighting power causes the electrode material to return to a wide area of the electrode tips, and furthermore that varying the waveform of the lighting current suppresses fluctuation in the arc position and causes the electrode material to return to the central portion of the electrode tips.

The inventors also discovered that bringing the lighting power back to the vicinity of the rated power value causes the returned electrode material to melt and brings the shape of the electrode tips close to an appropriate shape, thereby improving the electron emission spot or arc spot.

The inventors furthermore discovered that performing "low power lighting at a lighting power lower than the rated power" and "high power lighting at a lighting power that is higher than the lighting power during the low power lighting" enables suppressing a reduction in lamp voltage (i.e., improving the interelectrode distance) and improving the appropriate arc spot in a short period of time.

In order to solve the above issues, one aspect of the present invention is a projection-type image display apparatus that uses a high pressure discharge lamp, which utilizes a halogen cycle, as a light source by lighting the high pressure discharge lamp at one of a rated power and a power that is lower than the rated power, the projection-type image display apparatus including: a processing unit operable to execute property improvement processing that improves a lamp property while the high pressure discharge lamp is being lit; a reception unit operable to receive an instruction to execute the property improvement processing; and a control unit operable to, when the reception unit has received the instruction to execute the property improvement processing, instruct the processing unit to execute the property improvement processing.

Here, "a projection-type image display apparatus that uses a high pressure discharge lamp, which utilizes a halogen cycle, as a light source by lighting the high pressure discharge lamp at one of a rated power and a power that is lower than the rated power" is a projection-type image display apparatus that can adjust a screen brightness when normally displaying an image and a screen brightness when displaying an image darker than usual (in other words, "eco mode"). Specifically, this is an apparatus that can vary the lighting power used to light the high pressure discharge lamp that is the light source.

Also, regarding "when the reception unit has received the instruction to execute the property improvement processing", the instruction may be received after the lamp property has degraded, or before the lamp property has degraded. In other words, the lamp property can be improved when the instruction is received, regardless of the condition of the lamp property.

Note that regarding "when the reception unit has received the instruction to execute the property improvement processing, instruct the processing unit to execute the property improvement processing", if the power supply of the apparatus is turned off (i.e., the high pressure discharge lamp is extinguished) after the instruction to execute the property improvement processing has been received, the instruction may be stored, and the property improvement processing may be executed the next time the apparatus is turned on. Also, the property improvement processing may be executed while lighting the high pressure discharge lamp without displaying an image.

Also, the lamp property may degrade over time, the projection-type image display apparatus may further include: a judgment unit operable to judge whether a timing for improving the degraded lamp property has arrived; and an alert unit operable to, if the timing for improving the degraded lamp property has arrived, make an alert that the lamp property should be improved, and when the reception unit has received the instruction after the alert unit has made the alert, the control unit may instruct the processing unit to execute the property improvement processing in order to improve the degraded lamp property. Alternatively, the property improvement processing may include processing for performing low power lighting of the high pressure discharge lamp by temporarily changing the lighting power of the high pressure discharge lamp to a first value that is lower than the rated power.

Also, the property improvement processing may further include processing for, after performing the low power lighting, performing high power lighting of the high pressure discharge lamp by temporarily changing the lighting power of the high pressure discharge lamp to a second value that is higher than the lighting power during the low power lighting. Alternatively, the property improvement processing may further include processing for temporarily changing at least one of a lighting frequency and a lighting waveform while performing the low power lighting, temporarily changing the lighting frequency involves changing the lighting frequency of the high pressure discharge lamp to a value that is less than or equal to the lighting frequency being used in rated power lighting, and temporarily changing the lighting waveform may involve changing the lighting waveform of the high pressure discharge lamp to a value that is greater than or equal to the lighting waveform being used in the rated power lighting.

Furthermore, the property improvement processing may further include processing for temporarily changing at least one of a lighting frequency and a lighting waveform while performing the low power lighting and the high power lighting, in the low power lighting, temporarily changing the lighting frequency may involve changing the lighting frequency of the high pressure discharge lamp to a value that is less than or equal to the lighting frequency being used in rated power lighting, and temporarily changing the lighting waveform may involve changing the lighting waveform of the high pressure discharge lamp to a value that is greater than or equal to the lighting waveform being used in the rated power lighting, and in the high power lighting, temporarily changing the lighting frequency may involve changing the lighting frequency of the high pressure discharge lamp to a value that is greater than or equal to the changed lighting frequency being used in the low power lighting, and temporarily changing the lighting waveform may involve changing the lighting waveform of the high pressure discharge lamp to a value that is less than or equal to the changed lighting waveform being used in the low power lighting. Alternatively, in the property improvement processing, the processing for performing the low power lighting and high power lighting may be performed one or more times.

Also, in the property improvement processing, an amount by which the lighting power is changed may differ according to a change over time in the lamp property of the high pressure discharge lamp. Additionally, the amount by which the lighting power is changed may differ according to a change in an illuminance of the high pressure discharge lamp. Furthermore, in the low power lighting, the lighting power may be changed to a value that is 85 (%) or less of the rated power, and in the high power lighting, the lighting power may be changed to a value that is in a range of 90(%) to 100(%) inclusive of the rated power.

In order to solve the above issues, another aspect of the present invention is a lighting apparatus that lights a high pressure discharge lamp, which utilizes a halogen cycle, at one of a rated power and a power that is lower than the rated power, the lighting apparatus including: a processing unit operable to execute property improvement processing that improves a lamp property while the high pressure discharge lamp is being lit; a reception unit operable to receive an instruction to execute the property improvement processing; and a control unit operable to, when the reception unit has received the instruction to execute the property improvement processing, instruct the processing unit to execute the property improvement processing.

Here, "a lighting apparatus that lights a high pressure discharge lamp, which utilizes a halogen cycle, at one of a rated power and a power that is lower than the rated power" is a lighting apparatus that can normally light a high pressure discharge lamp, and also light a high pressure discharge lamp darker than usual (in other words, "dimmed lighting").

Also, regarding "when the reception unit has received the instruction to execute the property improvement processing", the instruction may be received after the lamp property has degraded, or before the lamp property has degraded. In other words, the lamp property can be improved when the instruction is received, regardless of the condition of the lamp property.

Note that regarding "when the reception unit has received the instruction to execute the property improvement processing, instruct the processing unit to execute the property improvement processing", if the power supply of the apparatus is turned off (i.e., the high pressure discharge lamp is extinguished) after the instruction to execute the property improvement processing has been received, the instruction may be stored, and the property improvement processing may be executed the next time the apparatus is turned on.

Also, the lamp property may degrade over time, the lighting apparatus may further include: a judgment unit operable to judge whether a timing for improving the degraded lamp property has arrived; and an alert unit operable to, if the timing for improving the degraded lamp property has arrived, make an alert that the lamp property should be improved, and when the reception unit has received the instruction after the alert unit has made the alert, the control unit may instruct the processing unit to execute the property improvement processing in order to improve the degraded lamp property.

In order to solve the above issues, another aspect of the present invention is a lighting method for lighting a high pressure discharge lamp, which utilizes a halogen cycle, at one of a rated power and a power that is lower than the rated power, including the steps of: judging whether a timing for improving a lamp property has arrived; making an alert that the lamp property should be improved, if the timing for improving the degraded lamp property has arrived; receiving an instruction to improve the lamp property; and if the instruction to improve the lamp property has been received after the alert has been made, executing property improvement processing that improves the lamp property while the high pressure discharge lamp is being lit, in order to improve the degraded lamp property.

Also, the executing step may include processing for performing low power lighting of the high pressure discharge lamp by temporarily changing the lighting power of the high pressure discharge lamp to a first value that is lower than the rated power, and processing for, after performing the low power lighting, performing high power lighting of the high pressure discharge lamp by temporarily changing the lighting power of the high pressure discharge lamp to a second value that is higher than the lighting power during the low power lighting.

BRIEF DESCRIPTION OF THE DRAWINGS

These and other objects, advantages, and features of the invention will become apparent from the following description thereof taken in conjunction with the accompanying drawings, which illustrate specific embodiments of the present invention.

In the drawings:

FIG. 4 shows lamp control properties;

FIGS. 5A to 5C illustrate conditions of an electrode tip before and during lamp refresh processing;

FIG. 8 shows an exemplary control pattern table;

FIG. 11 shows a control pattern table for a lamp pertaining to a test;

FIG. 18 shows a control pattern table pertaining to a modification;

DESCRIPTION OF THE PREFERRED EMBODIMENTS

The following describes a front projection-type image display apparatus (hereinafter, maybe be simply called an "image display apparatus") pertaining to embodiments of the present invention.

Embodiment 1

1. Front Projection-Type Image Display Apparatus

The following describes a front projection-type image display apparatus (hereinafter, called a "liquid crystal projector") pertaining to the present invention with reference to the drawings.

Figure 1:
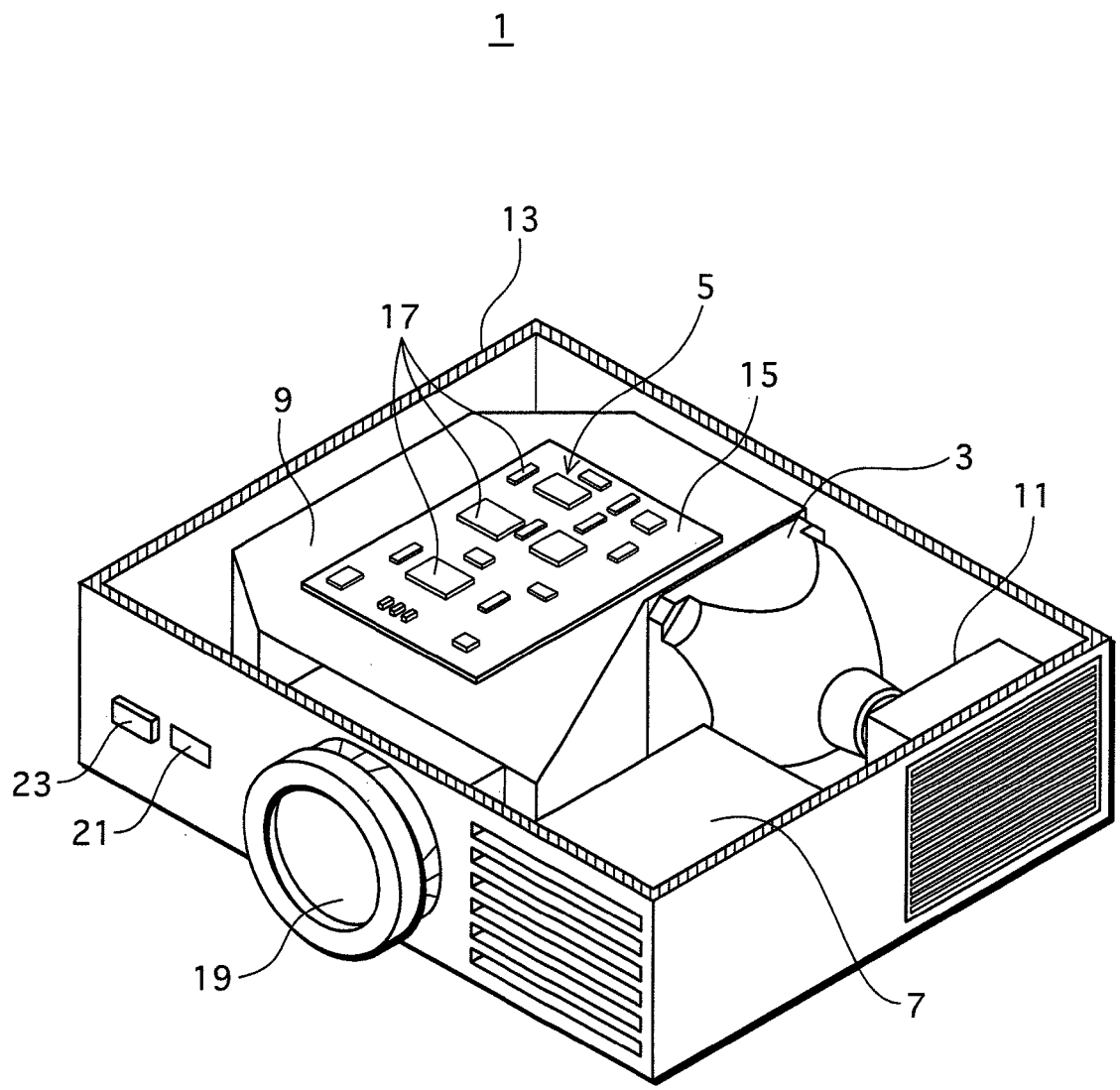
FIG. 1 is a partially cut away perspective view of a liquid crystal projector pertaining to embodiment 1.

FIG. 1 is a partially cut away perspective view of the liquid crystal projector pertaining to the present embodiment.

As shown in FIG. 1, a liquid crystal projector 1 includes a lamp unit 3 in which a lamp (not depicted) is provided, a control unit 5, a lighting apparatus 7 for lighting the lamp, a lens unit 9 in which a condensing lens, a transmission-type color liquid crystal display plate, and a drive motor are provided, a cooling fan 11, etc., all of which are arranged inside a casing 13.

In the liquid crystal projector 1, light emitted from the lamp unit 3 is condensed by the condensing lens etc. arranged in the lens unit 9, and transmitted through the color liquid crystal display plate arranged in the optical path. As a result, an image formed on the liquid crystal display plate is projected via a lens 19 etc. onto a screen (not depicted).

The control unit 5 includes a substrate 15 arranged above the lens unit 9 and a plurality of electrical/electronic elements 17 mounted on the substrate 15. The control unit 5 displays a color image by driving the color liquid crystal display plate based on an image signal input from an external device, and performs focusing operations and zoom operations by controlling the drive motor arranged in the lens unit 9.

In addition to the above functions, the control unit 5 instructs the lighting apparatus 7 to perform lamp lighting and extinguishing and instructs the lighting apparatus 7 to perform processing for improving lamp properties that have degraded while the lamp is being lit (hereinafter, this processing is called "lamp refresh processing" and corresponds to "property improvement processing" of the present invention).

When the lamp voltage reaches a predetermined voltage during lighting at rated power, information to that effect is fed back from the lighting apparatus 7 to the control unit 5. Upon receiving such information, the control unit 5 causes a display unit 21 to be lit to indicate to a user that a timing for performing lamp refresh processing has been reached. When the user operates an operation unit 23 (e.g., a button switch) to cause lamp refresh processing to be executed, the control unit 5 sends an instruction to perform lamp refresh processing.

Note that if the user does not operate the operation unit 23 (i.e., if the user's instruction has not been received) even though the display unit 21 is displaying that the timing for performing lamp refresh processing has been reached, the control unit 5 transmits a control signal to the lighting apparatus 7 to cause sustained lighting at the normal rated power to be continued, and performs normal control, such as displaying an image based on an image signal received from an external device.

2. Lamp Unit

Figure 2:
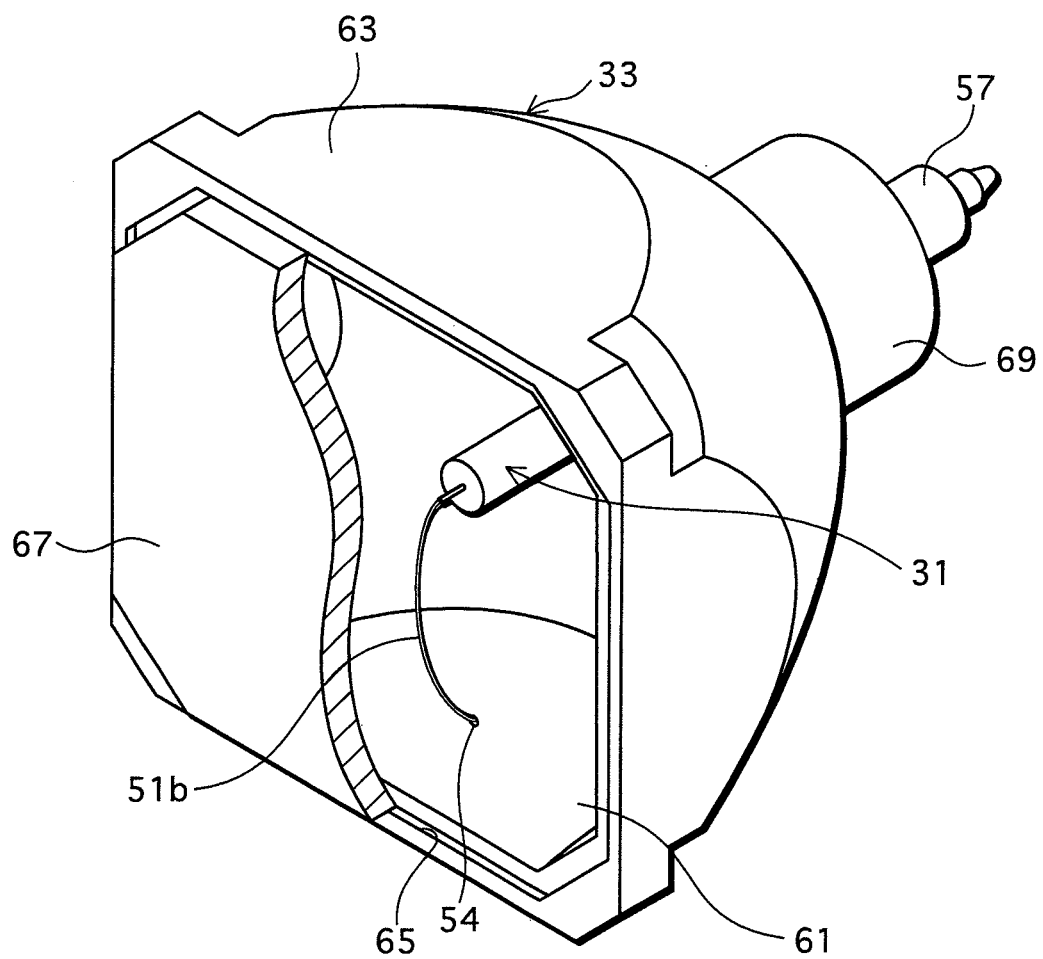
FIG. 2 is a perspective view of a lamp unit pertaining to embodiment 1.
Figure 3:
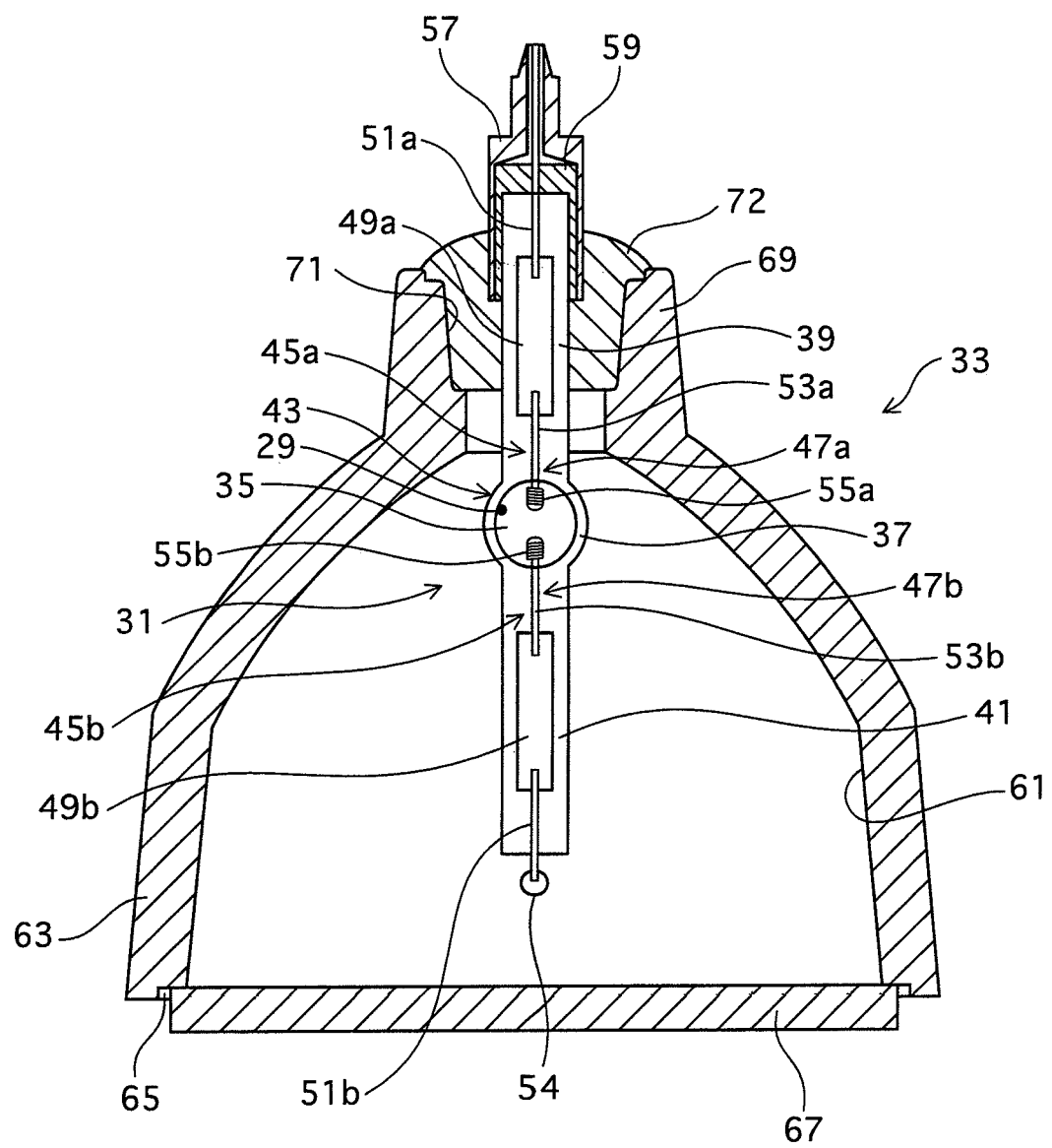
FIG. 3 is a plan view of the lamp unit, where part of a reflecting mirror has been cut away to show a condition of a lamp inside the lamp unit.

FIG. 2 is a perspective view of the lamp unit pertaining to the present embodiment. FIG. 3 is a plan view of the lamp unit, where a portion of a reflecting mirror has been cut away to show a condition of the lamp inside the lamp unit.

As shown in FIG. 2, the lamp unit 3 includes a lamp 31 and a reflecting mirror 33, and the lamp 31 is mounted inside the reflecting mirror 33.

(1) Lamp Structure

As shown in FIG. 3, the lamp 31 is constituted from a discharge container 43 including a light emitting part 37 in which a discharge space 35 is included, and sealed parts 39 and 41 provided on respective ends of the light emitting part 37; and electrode structure bodies 45a and 45b that are sealed in the sealed parts 39 and 41 respectively so that the tips (the later-described electrodes) of the electrode structure bodies 45a and 45b oppose each other inside the discharge space 35.

The electrode structure bodies 45a and 45b respectively include electrodes 47a and 47b, metal foil 49a and 49b, and external lead wires 51a and 51b that are connected in the stated order (e.g., welded together). Here, the electrodes 47a and 47b are the tips of the electrode structure bodies 45a and 45b.

The external lead wires 51a and 51b respectively extend outward from the ends of the sealed parts 39 and 41 that are away from the light emitting part 37. Note that as shown in FIG. 2 and FIG. 3, the external lead wire 51b passes through a through-hole 54 formed in the reflecting mirror 33 and extends outward from the reflecting mirror 33.

The electrodes 47a and 47b respectively include electrode rods 53a and 53b and electrode coils 55a and 55b provided on the tops of the electrode rods 53a and 53b. The electrodes 47a and 47b are arranged so that the electrode rods 53a and 53b oppose each other in substantially a straight line in the discharge space 35. Protrusions have been formed on tip portions of the electrode coils 55a and 55b so as to stabilize the arc generation positions.

Note that the electrode rods and electrode coils of the electrodes may be constituted from the same material (e.g., tungsten) or different materials.

In the electrode structure bodies 45a and 45b, mainly the metal foil 49a and 49b is sealed in the sealed parts 39 and 41 such that the distance between the electrode coils 55a and 55b (called the interelectrode distance) is a predetermined distance. This results in the formation of the discharge space 35 in the light emitting part 37. As shown in FIG. 3, the electrode structure bodies 45a and 45b are sealed in the sealed parts 39 and 41 respectively, and the electrodes 47a and 47b extend out from the sealed parts 39 and 41 respectively into the discharge space 35.

Enclosed in the discharge space 35 is a light-emitting material such as mercury 39, as well as a start-up supplementing gas, and a halide for the halogen cycle.

As shown in FIG. 3, a base 57 is attached via cement 59 to the end of either the sealed part 39 or 41 that is away from the light emitting part 37 (in FIG. 3, the base 57 is attached to the end of the sealed part 39 that is away from the light emitting part 37), and the external lead wire 51a is connected to the base 57.

(2) Reflecting Mirror Structure

As shown in FIG. 2 and FIG. 3, the reflecting mirror 33 has a main body material 63 on which a reflecting surface 61 has been formed as a concave surface. Front glass 67 is provided in an opening 65 of the main body material 63. Note that the front glass 67 is fixed to the main body material 63 with the use of silicone-based adhesive.

The reflecting mirror 33 is, for example, a dichroic reflecting mirror, and reflects light emitted from the light emitting part 37 of the lamp 31, toward a second focal point (toward the front glass 67). Note that the reflecting surface 61 has been set so as to reflect light emitted from between the electrodes 47a and 47b at an early stage of the cumulative lighting time (hereinafter, this period is called the "initial lighting stage"), toward the second focal point. When, for example, the cumulative lighting time becomes long and the interelectrode distance increases, the central light emitting point of the lamp 31 shifts with respect to the reflecting mirror 33, as a result of which the light emitted from the lamp 31 is less effectively reflected toward the second focal point.

The main body material 63 is funnel-shaped, and as shown in FIG. 3, a through-hole 71 is formed in a part 69 having a small opening diameter. The sealed part 39 of the lamp 31 has been inserted into the through-hole 71. Note that the sealed part 39 of the lamp 31 that has been inserted into the through-hole 71 may be fixed to the reflecting mirror 33 with the use of, for example, cement 72.

3. Lamp Lighting Method

The following describes a lighting method for the lamp 31. FIG. 4 shows lamp control properties.

FIG. 4 shows a relationship between lamp power Wla and lamp voltage Vla that are supplied after dielectric breakdown has been caused by applying a high-voltage discharge voltage (e.g., a pulse voltage) to the lamp 31.

Upon reception of an instruction to begin lighting from the control unit 5, the lighting apparatus 7 applies a pulse voltage to the lamp 31 in order to cause dielectric breakdown in the lamp 31, and begins a discharge in the lamp 31.

Thereafter, as shown in FIG. 4, constant current control is first performed in an interval from after dielectric breakdown until an arbitrary set voltage has been reached (in FIG. 4, called the "constant current control interval") Thereafter, constant power control is performed (in FIG. 4, called the "constant power control interval").

Note that this lighting method is similar to conventional lighting methods. In constant power control, the rated power value is set as a constant power value, and lighting is performed at a predetermined lighting frequency (called the current frequency). Lighting during this type of control is called rated power lighting. The rated power value and frequency are set individually in accordance with the lamp specifications. Note that a concrete working example is described later in the section "Lamp specifications".

4. Lamp Refresh Processing

As described above, the lamp refresh processing is processing for improving lamp properties that have degraded. This processing brings the interelectrode distance close to the initial lighting stage by actively causing electrode material that has gradually evaporated off of the electrode tips to be deposited back on the electrode tips.

The lamp refresh processing is performed by lighting the lamp 31 while having temporarily changed at least one lighting parameter, namely the lighting frequency, lighting current waveform, or lighting power. Here, lighting of the lamp 31 during lamp refresh processing is called lamp refresh lighting, and is separate from the rated power lighting.

One specific example of lamp refresh processing involves temporarily lowering at least the lighting power (this state of lighting is called "low power lighting", and thereafter raising the lighting power to a lighting power that is higher than during the low power lighting (this state of lighting is called "high power lighting").

FIGS. 5A to 5C illustrate conditions of an electrode tip before and during the lamp refresh processing.

FIGS. 5A to 5C illustrate the electrode coil 55b of the electrode 47b, and the following describes the electrode coil 55b. Note that although the same phenomenon occurs with the electrode coil 55a of the electrode 47a as well, a description of this has been omitted due to being the same as the electrode 47b.

First, FIG. 5A shows a state of the electrode tip during rated power lighting before (directly before) lamp refresh processing. As the cumulative lighting time of the lamp increases, or as the elapsed time since the previous performance of lamp refresh processing increases, the amount of electrode material that evaporates becomes greater than the amount of electrode material that returns due to the halogen cycle, and the tip of the electrode coil 55b gradually recedes. In other words, as the cumulative lighting time of the lamp increases, or as the elapsed time since the previous performance of lamp refresh processing increases, the interelectrode distance increases.

FIG. 5B shows a state of the electrode tip during low power lighting after lamp refresh processing has been started. The electrode material that has evaporated off of the electrode coil 55b concentrates around and is deposited on the tip of the electrode coil 55b that has receded. This causes a decrease in the interelectrode distance that had increased due to the receding of the electrode coil 55b (i.e., this restores the interelectrode distance to a state close to the original state). Note that the low power lighting is performed for a predetermined time.

FIG. 5C shows a state of the electrode tip during high power lighting after the low power lighting has ended. The electrode material that has been deposited on the tip of the electrode coil 55b during the low power lighting is melted and formed into the appropriate tip shape. Note that the high power lighting is performed for a predetermined time.

The low power lighting and high power lighting enable restoring the tips of the electrodes 47a and 47b that had receded due to evaporation of the electrode material during rated power lighting, to the original state (a state close to the original state). In other words, the lamp refresh processing restores the lamp properties that had degraded due to electrode receding, thereby extending the lamp lifetime.

5. Lighting Apparatus (1) Structure

Figure 6:
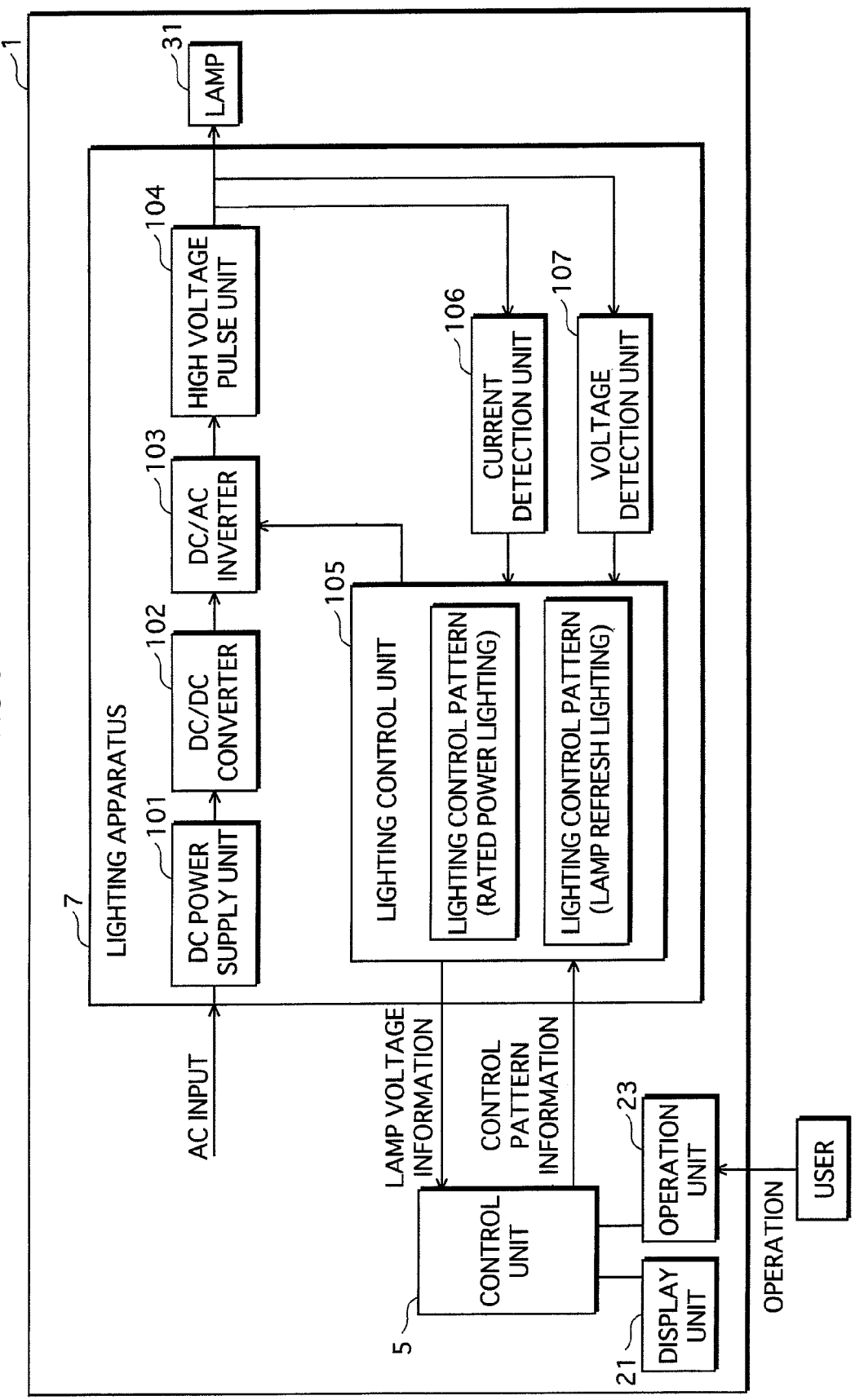
FIG. 6 is a block diagram showing a lighting apparatus for lighting the lamp.

FIG. 6 is a block diagram showing the lighting apparatus for lighting the lamp.

As shown in FIG. 6, the lighting apparatus 7 includes a DC power supply unit 101, a DC/DC converter 102, a DC/AC inverter 103, a high voltage pulse unit 104, a lighting control unit 105, a current detection unit 106, and a voltage detection unit 107.

The DC power supply unit 101 generates a direct current voltage from a household 100 (V) alternating current, and supplies the generated direct current voltage to the DC/DC converter 102. The DC/DC converter 102 converts the direct current voltage supplied from the DC power supply unit 101 into a direct current voltage having a predetermined voltage in accordance with a power setting signal received from the lighting control unit 105 that is described later, and supplies the direct current voltage having the predetermined voltage to the DC/AC inverter 103.

The DC/AC inverter 103 generates an AC square-wave current having a predetermined frequency from the direct current voltage supplied from the DC/DC converter 102, and applies the AC square-wave current to the lamp 31. The high voltage generation unit 104 is necessary for lighting the lamp 31, that is to say, is necessary to cause dielectric breakdown in the lamp 31. Note that the high voltage generation unit 104 generates, for example, a high voltage pulse.

The current detection unit 106 detects a current corresponding to the current flowing in the lamp 31, and sends a detection result to the lighting control unit 105. The voltage detection unit 107 detects a voltage corresponding to the voltage applied to the lamp 31, and sends a detection result to the lighting control unit 105.

In accordance with instructions from the control unit 5, the lighting control unit 105 performs rated power lighting of the lamp 31, extinguishes the lamp 31, and furthermore performs the above-described lamp refresh processing.

The lighting control unit 105 includes a storage unit (not depicted) that stores a table which includes lighting control patterns for rated power lighting (combinations of lighting parameters such as lighting power, lighting frequency, and lighting current waveform) and lighting control patterns for lamp refresh lighting (this table is called the "control pattern table"). The lighting control unit 105 supplies power to the lamp 31 (i.e., performs lamp lighting) in accordance with control pattern information indicated in an instruction received from the control unit 5. Note that a lighting control pattern is simply referred to as a control pattern.

The lighting control unit 105 judges whether the lamp voltage detected by the voltage detection unit 107 has reached a predetermined voltage. Upon judging that the lamp voltage has reached the predetermined voltage, the lighting control unit 105 transmits information indicating this (the "lamp voltage information" in FIG. 6) to the control unit 5.

Upon receiving the lamp voltage information, the control unit 5 causes the display unit 21 to be lit in order to display information for prompting the user to select whether to perform lamp refresh processing. The control unit 5 sends information indicating the user selection result (operating or not operating the operation unit 23) to the lighting control unit 105.

Here, the user selection result can indicate that either the user has selected to perform lamp refresh processing (i.e., has operated the operation unit 23), or has not selected to perform lamp refresh processing (i.e., has not operated the operation unit 23).

When the user has selected to perform lamp processing, control pattern information for lamp refresh lighting is sent to the lighting control unit 105, and when the user has not selected to perform lamp refresh processing, control pattern information for rated power lighting is sent to the lighting control unit 105 (i.e., the lighting control unit 105 is notified to not perform lamp refresh processing).

Upon receiving the control pattern information for lamp refresh lighting, the lighting control unit 105 sends an instruction to the DC/DC converter 102 etc. in order to stop the current rated power lighting and perform lamp refresh processing, that is to say, to perform lamp refresh lighting. Upon receiving the control pattern information for rated power lighting, the lighting control unit 105 sends an instruction to the DC/DC converter 102 etc. in order to continue the current rated power lighting, that is to say, to perform rated power lighting.

(2) Control Patterns

In the present embodiment, there are two control patterns for lighting the lamp 31, namely the rated power lighting pattern and the lamp refresh lighting pattern. Both patterns are based on constant power control and, as previously described, are defined as combinations of lighting parameters such as lighting power, lighting frequency, and lighting current waveform.

The lighting power indicates the power supplied to the lamp 31 by the lighting apparatus 7, and the lighting frequency indicates the frequency of the power at this time. Also, the waveform of the lighting current supplied to the lamp 31 is a square wave. The waveform is expressed as a ratio of the current crest value before polarity inversion to the effective value, and is defined as a flip-up rate.

Figure 7:
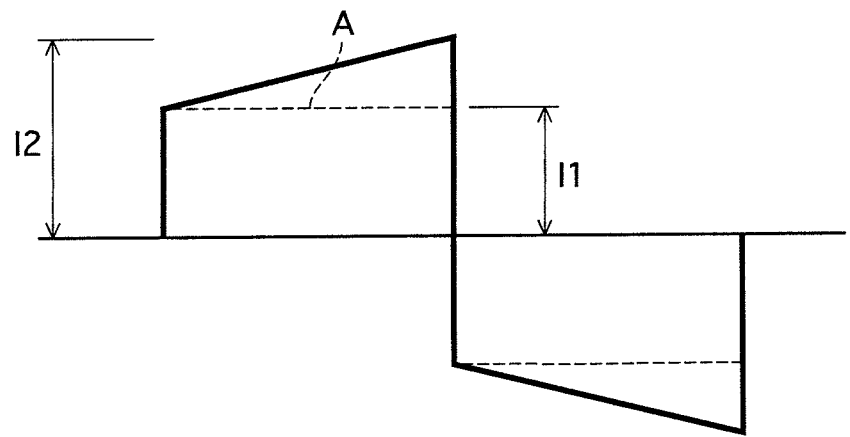
FIG. 7 is used for illustrating a flip-up rate.

FIG. 7 is used to illustrate the flip-up rate.

As shown in FIG. 7, the lighting current waveform is shaped as a square waveform (depicted as a broken line) on which a saw-shaped waveform has been superposed. The portion of the square waveform that corresponds to when the current value is constant (portion A in FIG. 7) is shaped so that the current value decreases as time elapses. The flip-up rate is a ratio of an effective value I1 before polarity inversion to a maximum current value I2 during homopolarity before inversion. In other words, the flip-up rate is defined as I2/I1.

FIG. 8 shows an exemplary control pattern table.

As shown in FIG. 8, a control pattern table Ta includes a lighting power W0, a lighting frequency f0, and a flip-up rate H0 in correspondence with rated power lighting during a normal state. The control pattern table Ta also includes a lighting power W1, a lighting frequency f1, a flip-up rate H1, and a time T1 in correspondence with low power lighting during lamp refresh processing. The control pattern table Ta also includes a lighting power W2, a lighting frequency f2, a flip-up rate H2, and a time T2 in correspondence with high power lighting during lamp refresh processing.

Rated power lighting is a state in which light emitted from the lamp 31 is used as the light source for the liquid crystal projector 1. Generally, as rated power lighting continues (i.e., as the cumulative lighting time increases), the lamp voltage increases, and the protrusions on the electrodes 47a and 47b are consumed (disappear). FIG. 5A shows a state in which the protrusion on the electrode tips have been consumed.

In FIG. 8, the control pattern for low power lighting is shown in correspondence with lamp refresh lighting (processing), and the control pattern for high power lighting also shown in correspondence with lamp refresh lighting (processing) below the control pattern for low power lighting. Note that during lamp refresh processing, low power lighting is performed for eight minutes, and thereafter high power lighting is performed for two minutes.

In low power lighting, there is a breakdown in the equilibrium between the evaporation of the electrode material off the tip of the electrodes 47a and 47b and the depositing of the electrode material. The depositing of the electrode material becomes greater than the evaporation of the electrode material, thereby forming deposited portions that correspond to the protrusions on the electrodes 55a and 55b, as shown in FIG. 5B.

In high power lighting, there is a breakdown in the equilibrium between the evaporation of the electrode material off the tip of the electrodes 47a and 47b and the depositing of the electrode material back on the tips due to the halogen cycle and, as shown in FIG. 5C, the deposited portions formed during low power lighting are formed into a state (shape) close to the initial stage of the cumulative lighting time.

This lamp refresh processing that includes performing low power lighting and high power lighting enables restoring the electrodes 47a and 47b, whose tips have receded, to a state close to the initial lifetime stage.

(3) Processing Performed by the Lighting Control Unit

Figure 9:
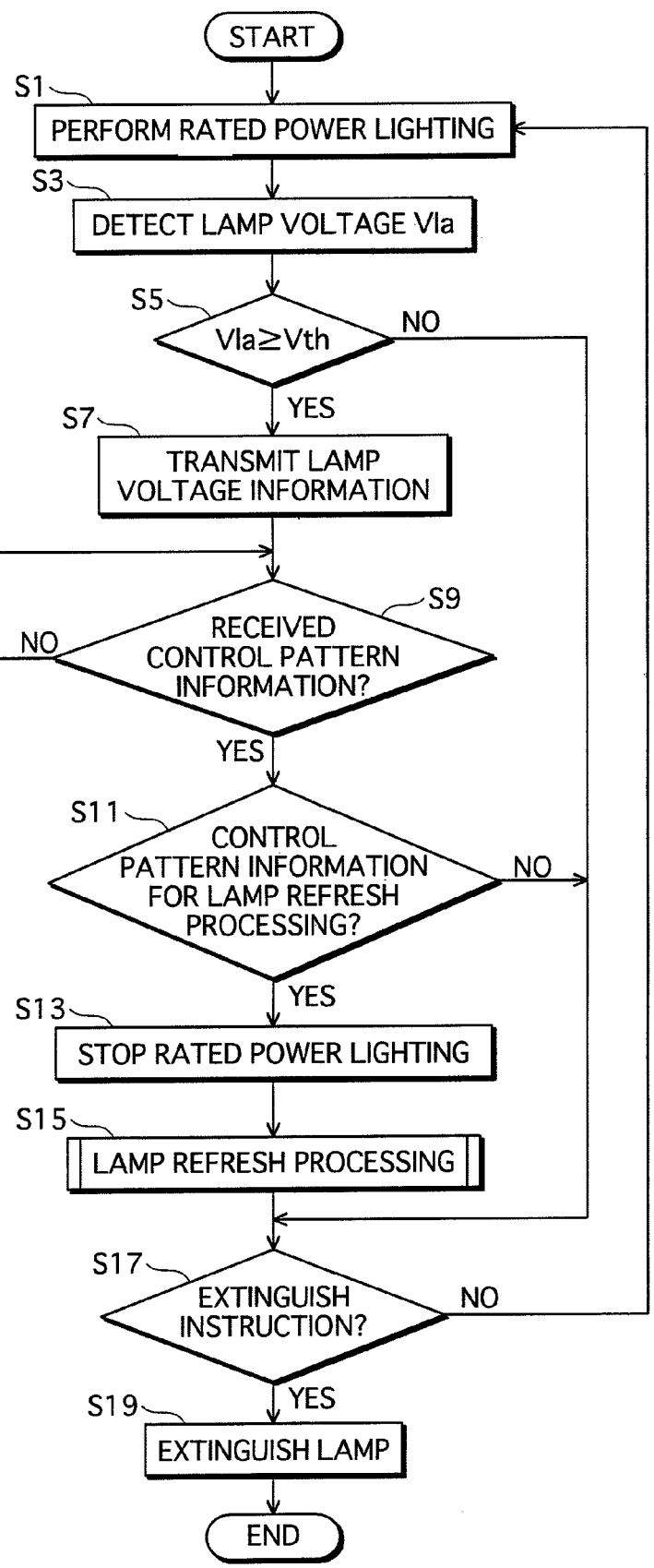
FIG. 9 is a flowchart showing lamp lighting control pertaining to embodiment 1.

FIG. 9 is a flowchart showing lamp lighting control pertaining to the present embodiment.

Upon receiving a lighting instruction (control pattern information for rated power lighting) from the control unit 5, the lighting control unit 105 of the lighting apparatus 7 initiates lighting of the lamp 31 and performs rated power lighting (step S1), and the voltage detection unit 107 detects the lamp voltage Vla (step S3).

The lighting control unit 105 then judges whether the detected lamp voltage Vla is greater than or equal to a preset predetermined voltage value Vth (step S5).

If the lamp voltage Vla is less than Vth (step S5:NO), the lighting control unit 105 continues performing rated power lighting, and judges whether an extinguishing instruction has been received from the control unit 5 in step S17. Upon receiving an extinguishing instruction (step S17:YES), the lighting control unit 105 extinguishes the lamp 31 (step S19) and ends processing.

If the lamp voltage Vla is greater than or equal to Vth (step S5:YES), the lighting control unit 105 transmits, to the control unit 5, lamp voltage information indicating that the lamp voltage Vla has reached or exceeded Vth (step S7).

Upon receiving the lamp voltage information indicating that the lamp voltage Vla has reached or exceeded Vth, the control unit 5 causes the display unit 21 to be lit in order to indicate to the user that the timing for performing lamp refresh processing has been reached. Upon receiving a user selection result, the control unit 5 transmits the user selection result (control pattern information for lamp refresh lighting) to the lighting control unit 105. Note that if a user selection result has not been received when a predetermined time period has elapsed since lighting of the display unit 21, the control unit 5 transmits information indicating that lamp refresh processing is not to be performed (the control pattern information for rated power lighting) to the lighting control unit 105.

In step S9, the lighting control unit 105 judges whether control pattern information has been received from the control unit 5. If control pattern information has not been received (step S9:NO), processing returns to step S9. If control pattern information has been received (step S9:YES), the lighting control unit 105 judges whether the received control pattern information is for lamp refresh lighting (step S11).

If the received control pattern information is for lamp refresh lighting (step S11:YES), the lighting control unit 105 stops the currently performed rated power lighting (step S13), and thereafter performs lamp refresh processing (step S15).

Thereafter, processing proceeds to step S17 in which the lighting control unit 105 judges whether an extinguishing instruction has been received from the control unit 5. If an extinguishing instruction has been received (step S17:YES), the lighting control unit 105 extinguishes the lamp 31 (step S19) and ends processing. If an extinguishing instruction has not been received (step S17:NO), processing returns to step S1, and rated power lighting is performed.

If the control pattern information is judged to be for lamp refresh processing in step S11 (step S11:NO), processing proceeds to step S17 in which the lighting control unit 105 judges whether an extinguishing instruction has been received from the control unit 5. Similarly to the above, if an extinguishing instruction has been received (step S17:YES), the lighting control unit 105 extinguishes the lamp 31 (step S19) and ends processing. If an extinguishing instruction has not been received (step S17:NO), processing returns to step S1, and rated power lighting is performed.

Figure 10:
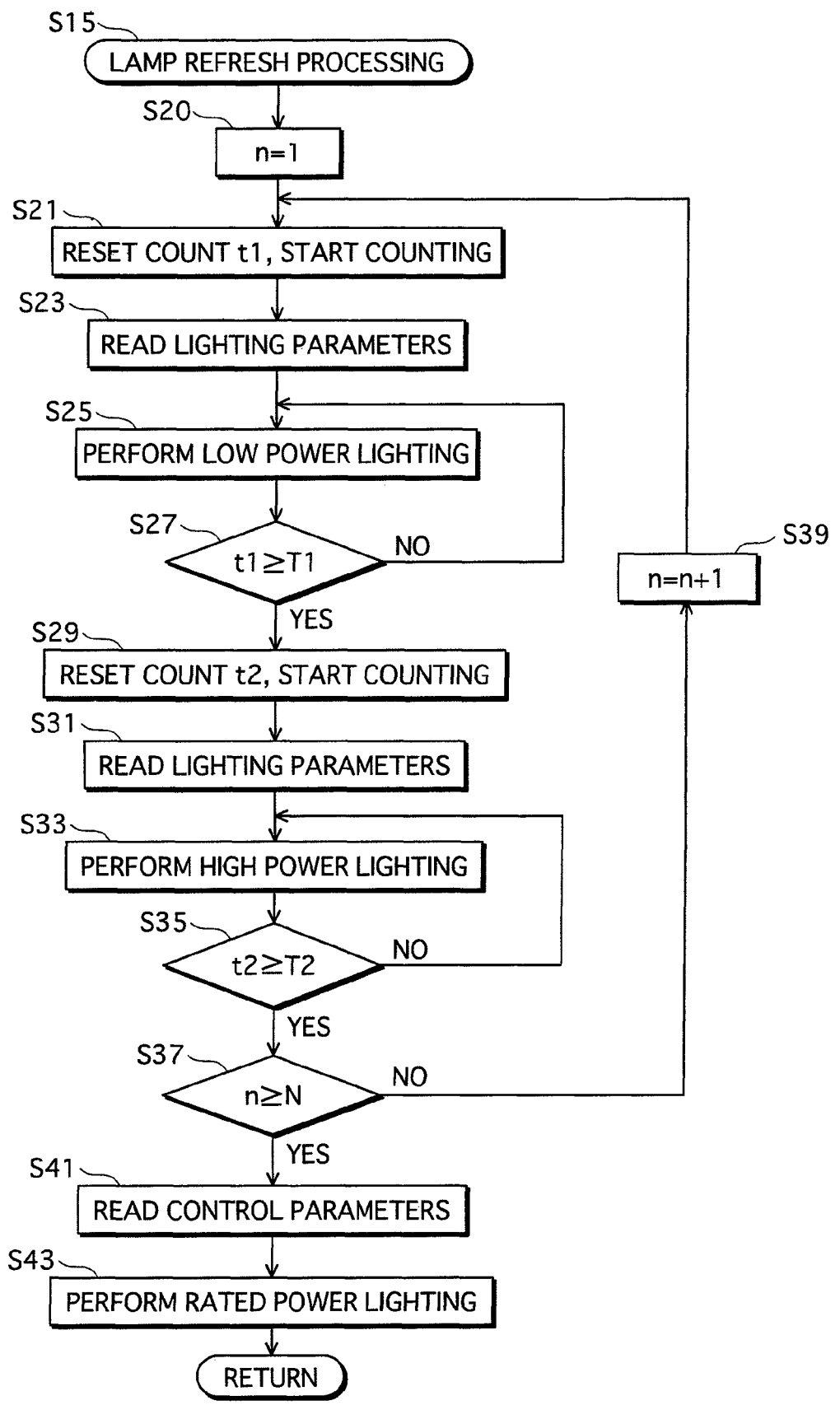
FIG. 10 is a flowchart showing lamp refresh processing.

FIG. 10 is a flowchart showing lamp refresh processing.

Upon starting lamp refresh processing, the lighting control unit 105 first sets a variable n to "1" (step S20). The variable n indicates the number of times that low power lighting and high power lighting has been performed. The lighting control unit 105 then resets a count t1 and begins counting (step S21). The lighting control unit 105 then reads, from the control pattern table Ta shown in FIG. 8, the lighting parameters lighting power W1, lighting frequency f1, lighting current waveform H1, and low power lighting time T1 in correspondence with low power lighting during lamp refresh processing (step S23).

Based on the read lighting parameters, the lighting control unit 105 sends instructions to the DC/DC converter 102 and the DC/AC inverter 103 to output a predetermined current, a predetermined voltage, etc., and performs low power lighting (step S25). The lighting control unit 105 then judges whether the count t1 has reached the low power lighting time T1 (step S27).

If the count t1 has not reached the low power lighting time T1 (step S27:NO), processing returns to step S25, and low power lighting is continued. If the count t1 has reached the low power lighting time T1 (step S27:YES), processing proceeds to step S29 in which the lighting control unit 105 resets a count t2 and begins counting. The lighting control unit 105 then reads, from the control pattern table Ta, the lighting parameters lighting power W2, lighting frequency f2, lighting current waveform H2, and high power lighting time T2 in correspondence with how power lighting during lamp refresh processing (step S31).

Based on the read lighting parameters, the lighting control unit 105 sends instructions to the DC/DC converter 102 and the DC/AC inverter 103 to output a predetermined current, a predetermined voltage, etc., and performs high power lighting (step S33). The lighting control unit 105 then judges whether the count t2 has reached the high power lighting time T2 (step S35).

If the count t2 has not reached the high power lighting time T2 (step S35:NO), processing returns to step S33, and high power lighting is continued. If the count t2 has reached the high power lighting time T2 (step S35:YES), the lighting control unit 105 judges whether the variable n has reached a set value N (step S37).

If the variable n has not reached the set value N (step S37:NO), the lighting control unit 105 increments the variable n by 1 in step S39, and processing returns to step S21. If the variable n has reached the set value N (step S37:YES), the lighting control unit 105 reads, from the control pattern table Ta, the lighting parameters lighting power W0, lighting frequency f0, and lighting current waveform H0 in correspondence with rated power lighting (step S41).

Based on the read lighting parameters, the lighting control unit 105 sends instructions to the DC/DC converter 102 and the DC/AC inverter 103 to output a predetermined current, a predetermined voltage, etc., and performs rated power lighting (step S43). Processing then returns to step S17 of FIG. 9.

6. Comparative Test

The following describes a lighting test that compares two cases of lighting. In one lighting test, lamp refresh processing was performed when the lamp voltage reached a predetermined voltage during rated power lighting of a lamp in a liquid crystal projector pertaining to the present embodiment. In the other lighting test, instead of performing lamp refresh processing, rated power lighting was continued even after the lamp voltage had reached the predetermined voltage.

Both of the lighting tests involved performing a series of cycles in which rated power lighting was performed for 3.5 hours, then the lamp was extinguished for 0.5 hours, and thereafter rated power lighting was performed again. The cumulative lighting time is the cumulative time for which the lamp was lit.

(1) Lamp Specifications

In both of the tests, the lamp 31 was a lamp used in, for example, a liquid crystal projector. The lamp 31 had a rated lamp power of 165 (W), and the interelectrode distance was set to 1.0 (mm) in order to approximate a point light source.

Mercury was enclosed as a light-emitting material at 200 (mg/cm$^3$) per volume of the discharge space. The start-up supplementing gas was a rare gas such as argon, krypton, or xenon.

(2) Lighting Method

FIG. 11 shows the lamp control pattern table Ta pertaining to the comparative test.

As shown in FIG. 11, the lamp control pattern table Ta includes a control pattern for rated power lighting and a control pattern for lamp refresh lighting. For each of the control patterns shown in the control pattern table Ta shown in FIG. 11, lighting is performed accordance to the lighting parameters such as lighting power, lighting frequency, flip-up rate, time, etc. Note that the lighting current waveform of the control patterns is, as shown in FIG. 7, the square waveform on which a saw-shaped waveform has been superposed.

Also, the lighting control unit 105 performed low power lighting on the lamps in accordance with the flowchart shown in FIG. 9. Also, in FIG. 9, a "Vth" of 90 (V) was used as the reference for judging whether to perform lamp refresh processing.

The lamp refresh processing was performed in accordance with the flowchart shown in FIG. 10. T1 in FIG. 10 was "8 minutes" as shown in the control pattern table Ta of FIG. 11. T2 in FIG. 10 was "2 minutes" as shown in the control pattern table Ta of FIG. 11. The set value "N" was set to "2".

In order to confirm the results of the lamp refresh processing, in one case the lamp refresh processing was performed under the above conditions three times, and in another case the lamp refresh processing was not performed at all.

(3) Comparison of Results

Figure 12:
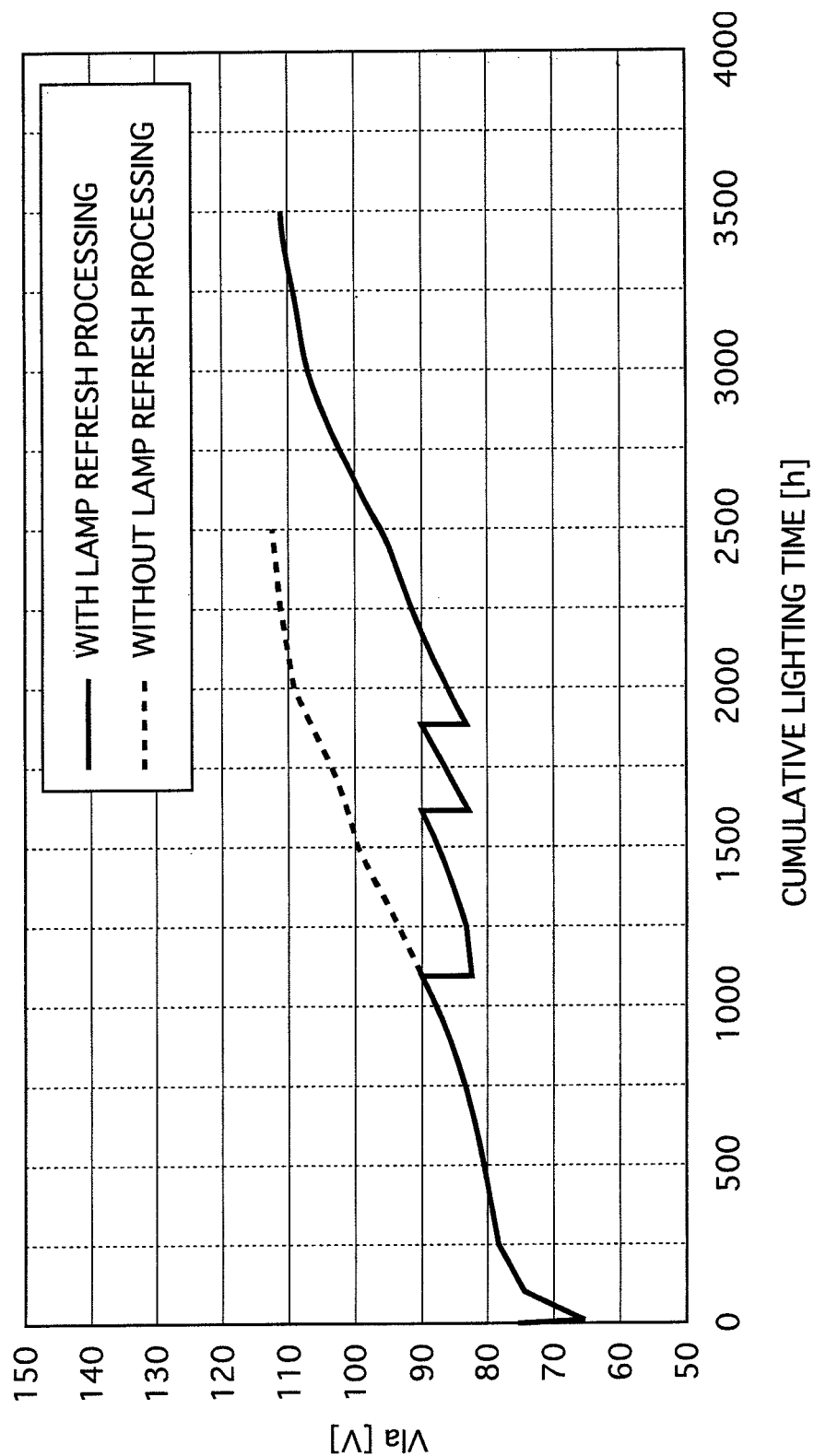
FIG. 12 shows results of a comparative test.
Figure 13:
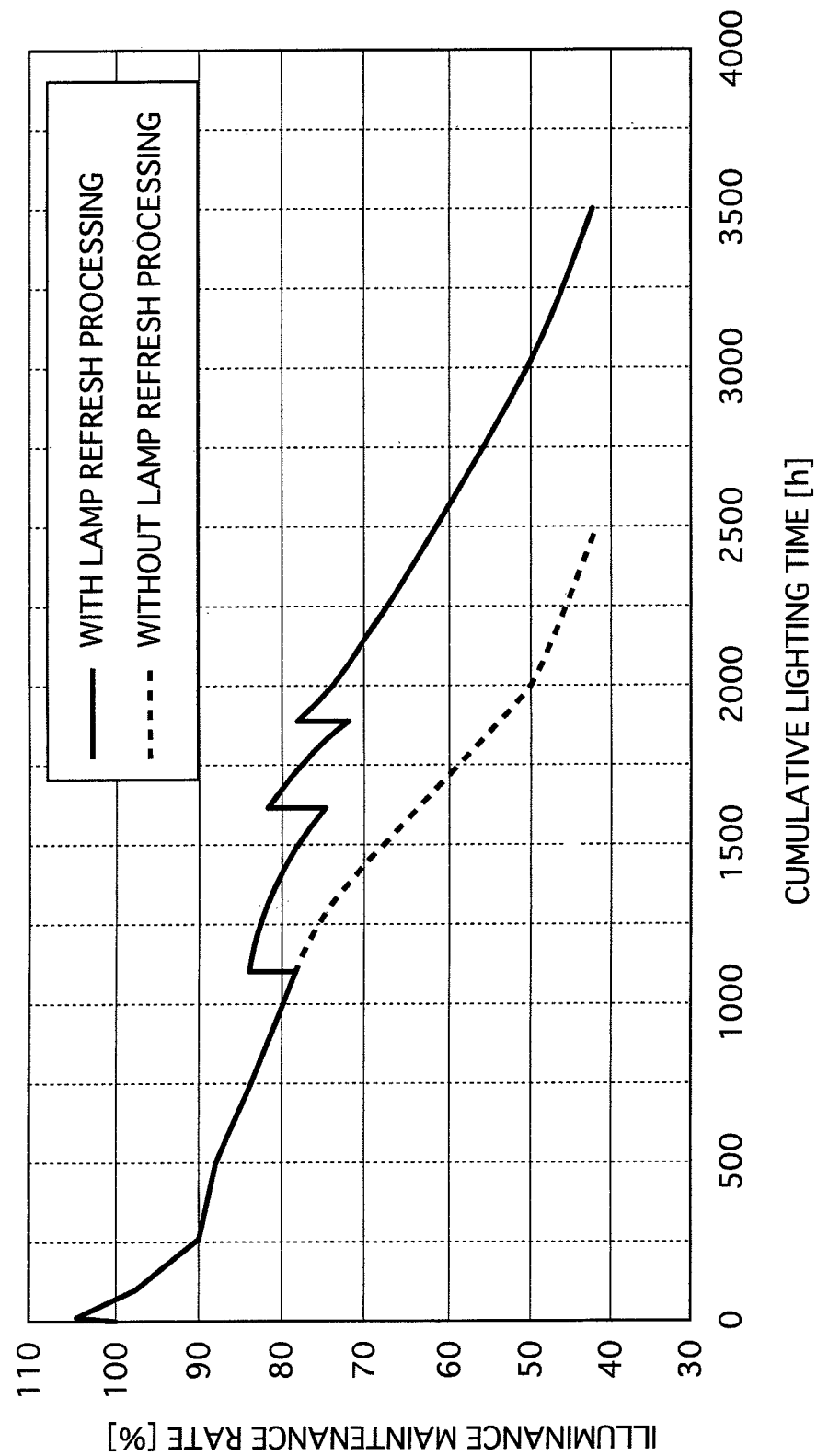
FIG. 13 shows results of a comparative test.

FIG. 12 and FIG. 13 show results of the comparative test.

Note that in FIGS. 12 and 13, the solid lines show results in a case of performing refreshing processing, and the broken lines show results in a case of not performing refreshing processing at all. In the present lighting method, the lifetime of the tested lamps were determined to have been reached when the average illuminance maintenance rate (%) fell to 50(%). Note that the illuminance was obtained by projecting light output from the lamp 31 onto a 40 inch screen after passing through an optical series, and measuring the illuminance of a center portion of the screen.

FIG. 12 shows that in the lighting method in which lamp refresh processing was not performed at all, the lamp voltage Vla rises as the cumulative lighting time increases. However, in the case of performing lamp refresh processing when the lamp voltage Vla reached 90 (V), the lamp voltage Vla fell around 8 (V) after performing lamp refresh processing each time.

Figure 14A:
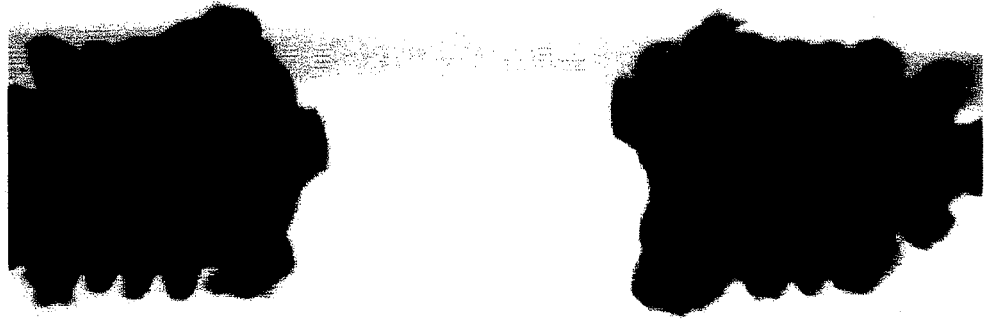
FIG. 14A includes a photograph showing a condition of electrode tips in a 165 (W) lamp before lamp refresh processing and FIG. 14B includes a photograph showing a condition of electrode tips in the 165 (W) lamp after lamp refresh processing.
Figure 14B:
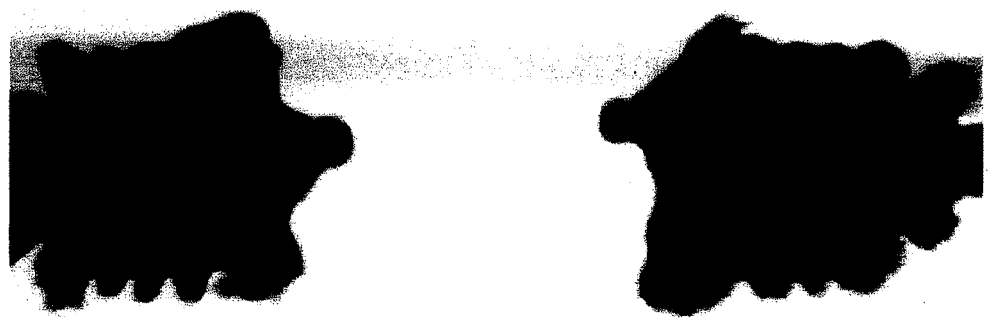

FIG. 14A includes a photograph showing a condition of electrode tips in a 165 (W) lamp before lamp refresh processing and FIG. 14B includes a photograph showing a condition of electrode tips in the 165 (W) lamp after lamp refresh processing. Note that the photographs in FIGS. 14A and 14B were taken specifically before and after performing lamp refresh processing for the first time during the initial lifetime stage.

As shown in FIG. 14A, before lamp refresh processing has been performed, the protrusion on the tip of one of the electrodes (the electrode on the left side of FIG. 14A) was observed to have disappeared. As shown in FIG. 14B, after lamp refresh processing has been performed, the protrusion that was not present before lamp refreshing processing was observed to have been newly formed on the tip of the electrode.

FIG. 13 shows that in the lighting method in which lamp refresh processing is not performed at all, the average illuminance maintenance rate (%) reached 50(%) when the cumulative lighting time reached approximately 2,000 hours. However, in the case of performing lamp refresh processing, the average illuminance maintenance rate (%) reached 50(%) when the cumulative lighting time reached approximately 3,000 hours.

This shows that, compared with a case of not performing lamp refresh processing at all, performing lamp refresh processing when the lamp voltage Vla reaches the predetermined voltage Vth (90 V) enables extending the time until the average illuminance maintenance rate reaches 50 (%) (i.e., the time until the lifetime is reached) by approximately 1,000 hours, as a result of which the cumulative lighting time is 1.5 times longer.

As the cumulative lamp lighting time increases, the consumption of the electrodes becomes greater than the return effect realized by the halogen cycle, the electrode tips gradually recede (the state before lamp refresh processing shown in FIG. 14A), and the lamp voltage rises due to an increase in interelectrode distance and a shift in the position of the discharge arc. Performing lamp refresh processing when the voltage rises enables restoring the interelectrode distance to a state close to the initial lighting stage (the state after lamp refresh processing shown in FIG. 14B), thereby extending the lamp lifetime.

7. Conclusion

As mentioned in the description of the related art, in the technology in which lighting is performed at a lamp power that is less than or equal to the rated value during the initial lifetime stage and the technology in which the power supplied to the lamp is changed according to the cumulative lighting time, lighting is constantly or periodically performed at a low power, thereby reducing the heat load on the lamp. Although such technology can extend the lamp lifetime, it is difficult to say that a sufficient brightness is ensured during rated power lighting.

In contrast, experimentation confirmed that in the liquid crystal projector of the present embodiment, lamp refresh processing which involves alternately performing low power lighting and high power lighting enables improving the interelectrode distance and improving an appropriate arc spot, and a rated brightness can be ensured during periods of the lamp lifetime in which lamp refresh process is not performed.

Also, in the liquid crystal projector of the present embodiment, a user is able to select whether to perform lamp refresh processing, thereby avoiding the sudden performance of lamp refresh processing that would cause a reduction in and variations in screen illuminance during processing, which would be unpleasant to the user.

Embodiment 2

In embodiment 1, the timing for performing lamp refresh processing is determined according to whether the lamp voltage has reached a predetermined voltage value (i.e., by detecting the lamp voltage). However, the timing for performing lamp refresh processing may be determined according to the cumulative lighting time, the illuminance of the lamp, or the amount of change in the lamp voltage. Also, lamp refresh processing may be performed at the determination of the user, regardless of the condition of the lamp.

In embodiment 2, the timing for performing lamp refresh processing is determined according to whether the cumulative lighting time has reached a set time (i.e., by detecting the cumulative lighting time).

1. Structure

In step S5 of the flowchart shown in FIG. 9 that was described in embodiment 1, the lighting control unit of embodiment 2 judges the cumulative lighting time instead of the lamp voltage Vla.

The set time used as a reference is a cumulative lighting time at which the lamp properties have degraded and lamp refresh processing is required. The set time is obtained in advance by testing etc. There may be one set time, or a plurality of set times. In the following concrete example, there are three set times, namely 1,000 hours, 1,500 hours, and 2,000 hours.

Figure 15:
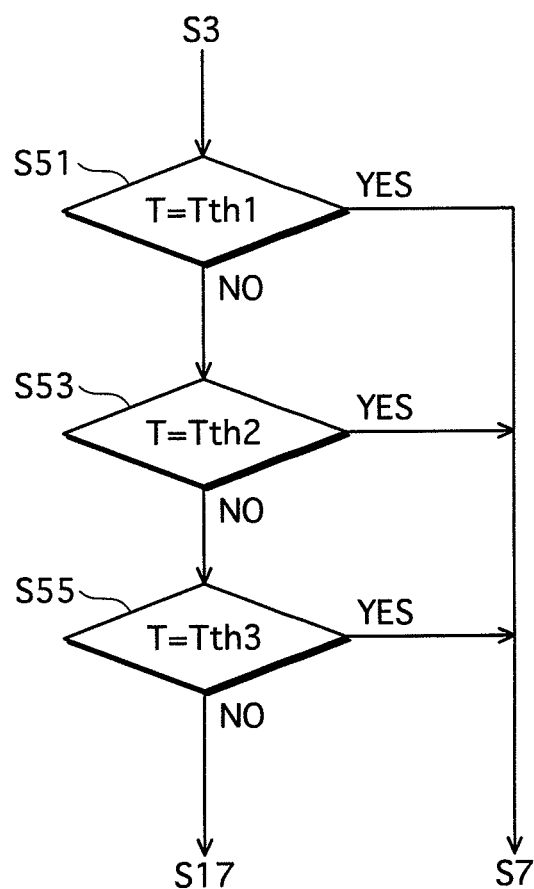
FIG. 15 is a flowchart showing operations performed by a lighting control unit of embodiment 2.

FIG. 15 is a flowchart showing processing performed by the lighting control unit of embodiment 2.

As described above, the lighting control unit of embodiment 2 performs steps S51, S53, and S55 in FIG. 15 instead of step S5 in FIG. 9.

First, in step S51, the lighting control unit judges whether a cumulative lighting time T is a first set time Tth1 (e.g., 1,000 hours). If the cumulative lighting time T is the first set time Tth1 (step S51:YES), the lighting control unit proceeds to step S7. If the cumulative lighting time T is not the first set time Tth1 (step S51:NO), the lighting control unit proceeds to step S53 and judges whether the cumulative lighting time T is a second set time Tth2 (e.g., 1,500 hours).

If the cumulative lighting time T is the second set time Tth2 (step S53:YES), the lighting control unit proceeds to step S7. If the cumulative lighting time T is not the second set time Tth2 (step S53:NO), the lighting control unit proceeds to step S55 and judges whether the cumulative lighting time T is a third set time Tth3 (e.g., 2,000 hours).

If the cumulative lighting time is the third set time Tth3 (step S55:YES), the lighting control unit proceeds to step S7. If the cumulative lighting time is not the third set time Tth3 (step S55:NO), the lighting control unit proceeds to step S17.

2. Comparative Test

Similarly to embodiment 1, the inventors of the present invention performed a comparative test for the liquid crystal projector of embodiment 2. Note that the lamps used in the test, the lighting conditions, and the lamp refresh processing was the same as in embodiment 1.

Figure 16:
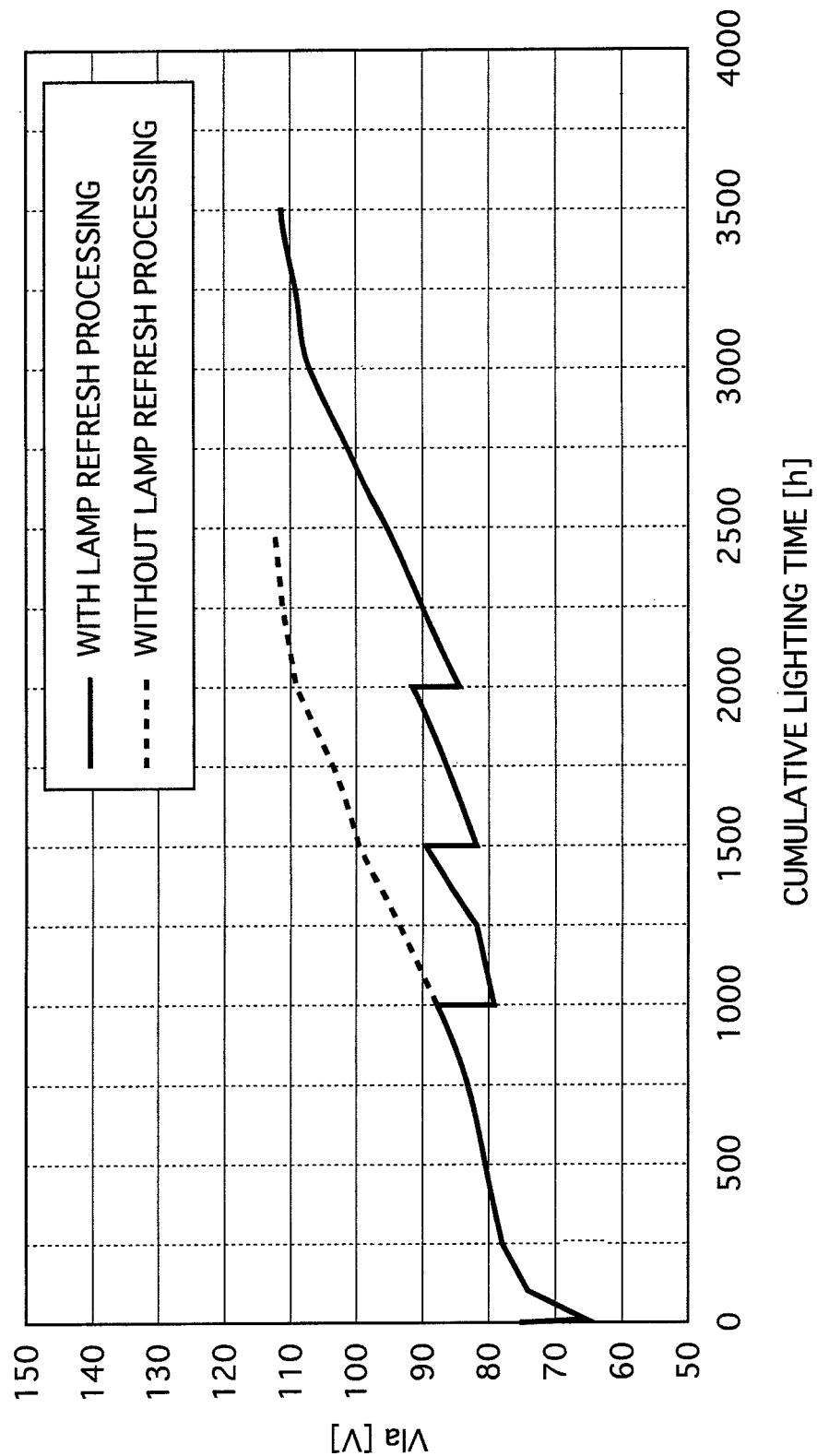
FIG. 16 shows results of a comparative test.
Figure 17:
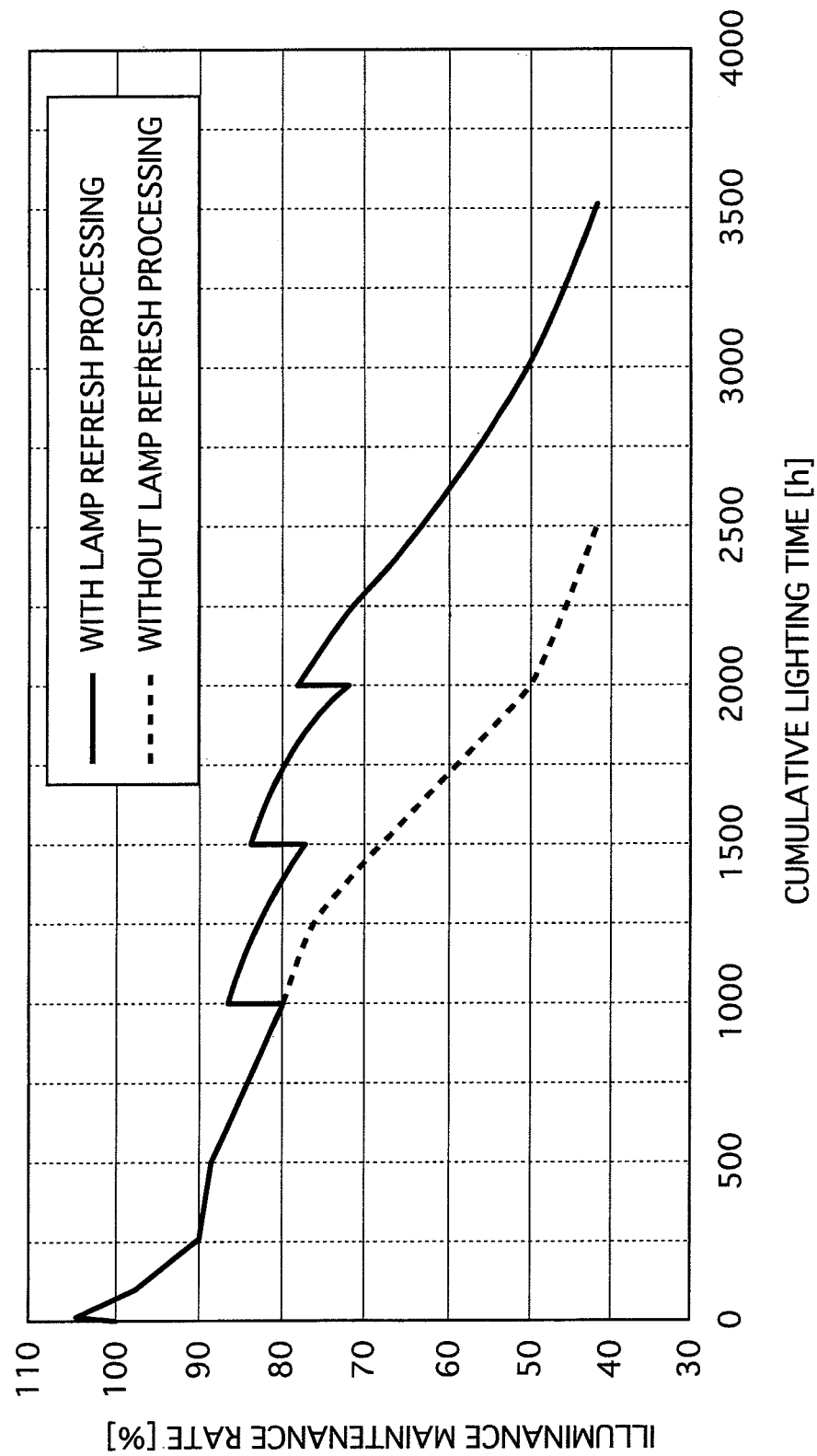
FIG. 17 shows results of a comparative test.

FIG. 16 and FIG. 17 show results of the comparative test.

Note that in FIGS. 16 and 17, the solid lines show results in a case of performing refreshing processing, and the broken lines show results in a case of not performing refreshing processing at all.

Similarly to embodiment 1, FIG. 16 shows that in the lighting method in which lamp refresh processing was not performed at all, the lamp voltage Vla rises as the cumulative lighting time increases. However, in the case of performing lamp refresh processing when the cumulative lighting time T reached the set times Tth of 1,000 hours, 1,500 hours, and 2,000 hours, the lamp voltage Vla fell around 8 (V) after performing lamp refresh processing each time.

FIG. 17 shows that in the lighting method in which lamp refresh processing is not performed at all, the average illuminance maintenance rate (%) reached 50(%) when the cumulative lighting time reached approximately 2,000 hours. In the case of performing lamp refresh processing when the cumulative lighting time reached the three set times Tth, the average illuminance maintenance rate (%) reached 50(%) when the cumulative lighting time reached approximately 3,000 hours.

This shows that, compared with a case of not performing lamp refresh processing at all, performing lamp refresh processing when the cumulative lighting time reaches the set times enables extending the time until the average illuminance maintenance rate reaches 50(%) (i.e., the time until the lifetime is reached) by approximately 1,000 hours, as a result of which the cumulative lighting time is 1.5 times longer.

The above results show that even when using the cumulative lighting time as a reference for detecting a timing to perform lamp refresh processing, the projection-type image display apparatus (lighting method) of the present invention achieves the same effect of extending the lamp lifetime as when using the lamp voltage as a reference.

MODIFICATIONS

Although the present invention has been described based on the above embodiments, the content of the present in the embodiments. Modifications such as the following are also applicable to the present invention.

1. Lamp

The above embodiments describe a case of applying the present invention to a projection-type image display apparatus (lighting method) that uses a lamp having a rated lamp power of 165 (W). However, the present invention may be applied to projection-type image display apparatuses (lighting methods) that use lamps having other rated lamp powers. The following describes a modification in which the present invention is applied to a lamp having a rated lamp power of 200 (W).

(1) Lighting Method

FIG. 18 shows a control pattern table pertaining to the present modification.

First, the control pattern table includes a lighting power W0 of 200 (W), a lighting frequency f0 of 115 (Hz), and a flip-up rate H0 of 110(%) in correspondence with rated power lighting. Note that lighting is performed under constant power control in each of the lighting patterns.

The control pattern table includes a lighting power W1 of 160 (W), a lighting frequency f1 of 85 (Hz), a flip-up rate H1 of 150(%), and a time of eight minutes in correspondence with low power lighting during lamp refresh processing. Also, the control pattern table includes a lighting power W2 of 200 (W), a lighting frequency f2 of 115 (Hz), a flip-up rate H2 of 130(%), and a time of two minutes in correspondence with high power lighting during lamp refresh processing.

Note that the set value "N" for how many times the low power lighting and high power lighting are to be repeated is "2". Also, the lamp voltage Vth for determining whether to perform lamp refresh processing in step S5 of FIG. 9 is 98 (V).

(2) Comparative Test

Figure 19:
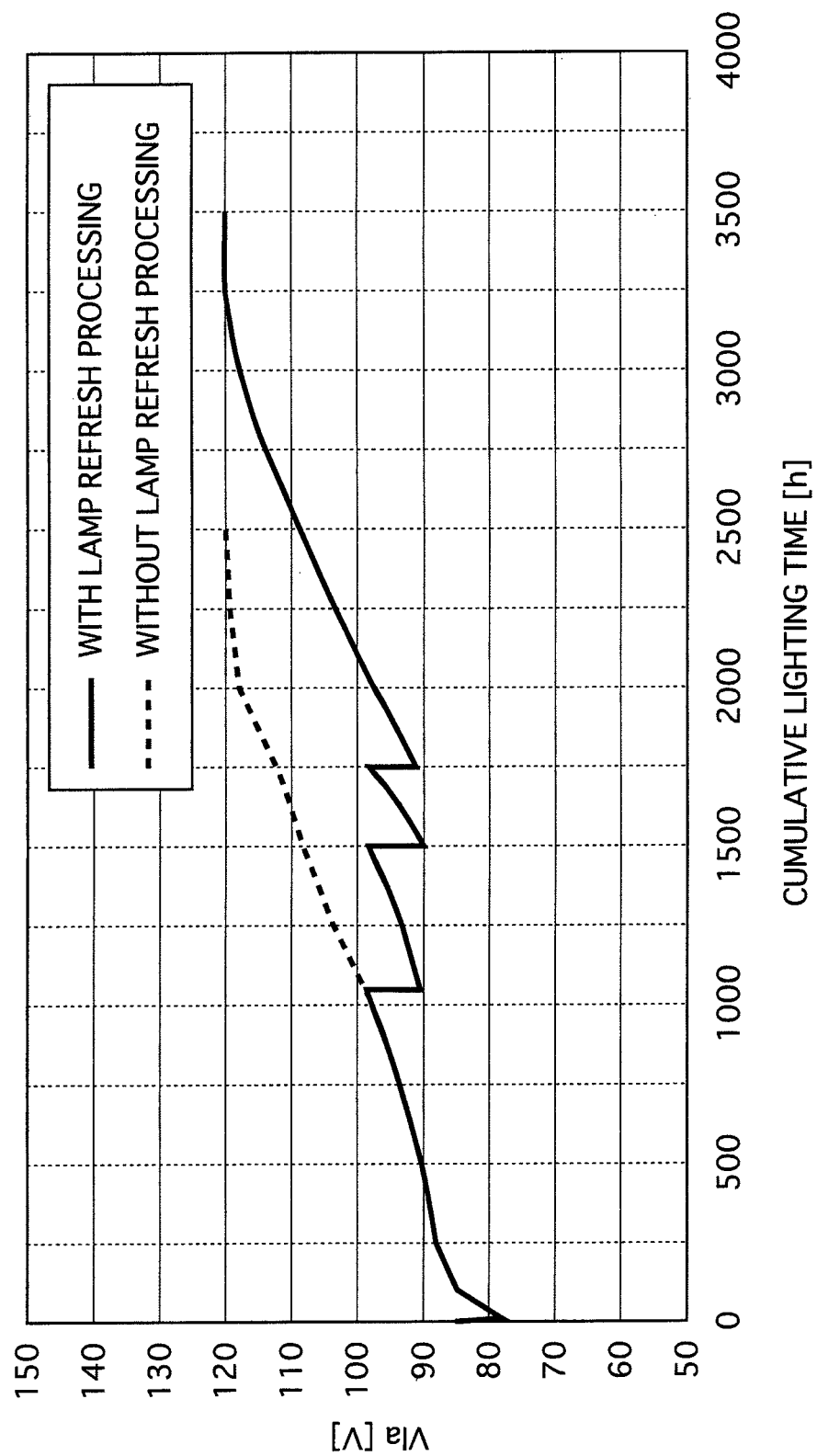
FIG. 19 shows results of a comparative test.
Figure 20:
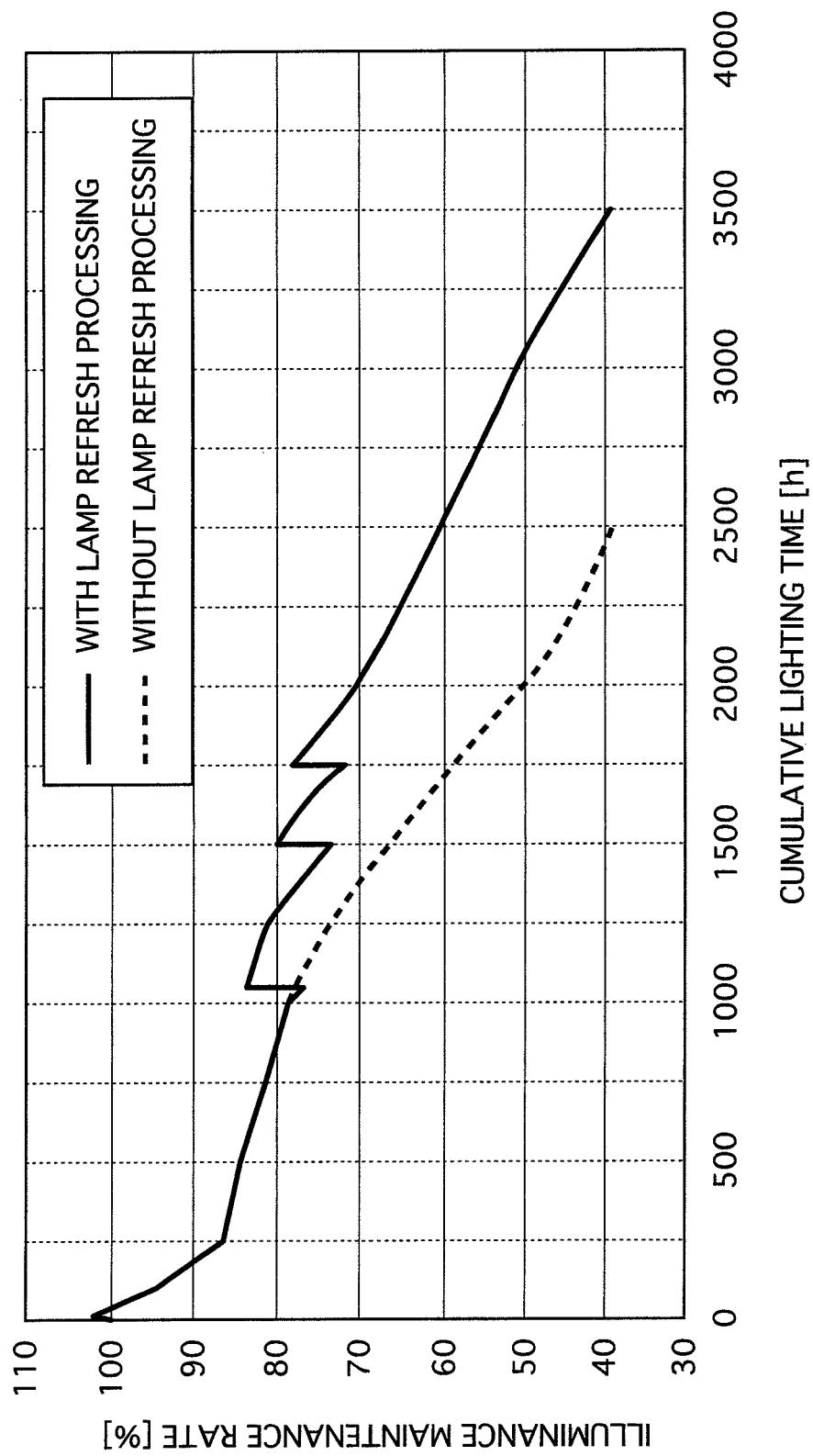
FIG. 20 shows results of a comparative test.

FIG. 19 and FIG. 20 show results of the comparative test.

Note that in FIGS. 19 and 20, the solid lines show results in a case of performing refreshing processing, and the broken lines show results in a case of not performing refreshing processing at all. Also, lamp processing was performed three times.

Similarly to embodiment 1, FIG. 19 shows that in the lighting method in which lamp refresh processing was not performed at all, the lamp voltage Vla simply rises as the cumulative lighting time increases. However, in the case of performing lamp refresh processing when the lamp voltage Vla reached 98 (V), the lamp voltage Vla fell around 8 (V) after performing lamp refresh processing each time.

FIG. 20 shows that in the lighting method in which lamp refresh processing is not performed at all, the average illuminance maintenance rate (%) reached 50(%) when the cumulative lighting time reached approximately 2,000 hours. However, in the case of performing lamp refresh processing, the average illuminance maintenance rate (%) reached 50(%) when the cumulative lighting time reached approximately 3,000 hours.

Figure 21A:
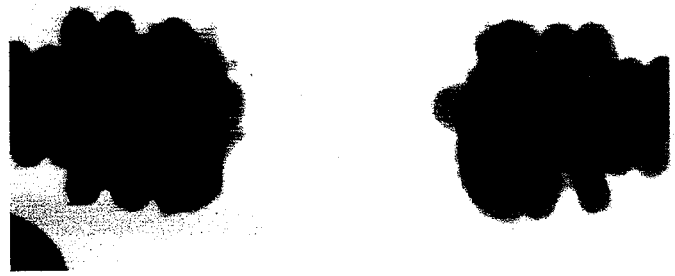
FIG. 21A includes a photograph showing a condition of electrode tips in a 200 (W) lamp before lamp refresh processing and FIG. 21B includes a photograph showing a condition of electrode tips in the 200 (W) lamp after lamp refresh processing.
Figure 21B:
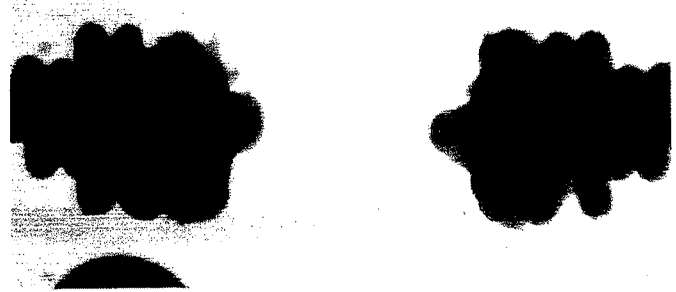

FIG. 21A includes a photograph showing a condition of electrode tips in a 200 (W) lamp before lamp refresh processing and FIG. 21B includes a photograph showing a condition of electrode tips in the 200 (W) lamp after lamp refresh processing. Note that the photographs in FIGS. 21A and 21B were taken specifically before and after performing lamp refresh processing three times during a late lifetime stage.

As shown in FIG. 21A, before lamp refresh processing has been performed, the protrusion on the tip of one of the electrodes (the electrode on the left side of FIG. 21A) was observed to have disappeared. As shown in FIG. 21B, after lamp refresh processing has been performed, the protrusion that was not present before lamp refreshing processing was observed to have been newly formed on the tip of the electrode.

These results show that even in the case of using a lamp that has a different rated power from the lamp described in embodiments 1 and 2, the lamp refresh processing of the present invention is effective in extending the time until the illuminance maintenance rate reaches 50(%) (i.e., the time until the lifetime is reached). Also, it can be inferred that the present invention can be applied to projection-type image display apparatuses (lighting methods) that use various high pressure discharge lamps, regardless of their rated lamp power.

(3) Lamp Specifications

A lamp pertaining to the present invention is not limited to the specifications described in embodiments 1 and 2. For example, the present invention can be applied to lamps having specifications in the following ranges.

For example, the lamp may have a rated lamp power of 100 (W) to 400 (W), and may be a short arc type in which the interelectrode distance is set in a range of 0.5 (mm) to 2.0 (mm).

Mercury may be enclosed as a light-emitting material in a range of 0.15 ($mg/mm^3$) to 0.35 ($mg/mm^3$) per volume of the discharge space. The start-up supplementing gas may be a rare gas such as argon, krypton, or xenon. The rare gas may be enclosed at an enclosed pressure in a range of 100 (mbar) to 400 (mbar) when the lamp is cool.

Furthermore, the halide may be, for example, bromine or iodine, and may be enclosed in a range of $1\times10^{-7}$ ($\mu mol/mm^3$) to $1\times10^{-2}$ ($\mu mol/mm^3$).

2. Lamp Refresh Processing (1) Lighting Conditions

Although all of the lighting parameters lighting power, lighting frequency, and flip-up rate were changed in the above embodiments, changing only the lighting power is also possible. Also, the setting of the lighting frequency and flip-up rate is not limited to the settings described in the embodiments and modifications. Experimentation etc. may be performed in advance to obtain conditions that realize the restoration of the interelectrode distance and the restoration of an appropriate arc spot.

(2) Lamp Power

As shown in FIG. 11, the lamp refresh processing of embodiment 1 involves alternately repeating low power lighting using a lighting power that is approximately 70(%) of the rated power (the lamp power during rated power lighting) and high power lighting using the same lighting power as the rated power. However, in the lamp refresh processing of the present invention, the lighting power during low power lighting may be set in a range of 30 (%) to 85(%) inclusive of the rated power, and the lighting power during high power lighting may be set in a range of 90(%) to 105(%) inclusive of the rated power.

If the lighting power during low power lighting is less than 30(%) of the rated power, the halogen cycle no longer functions effectively (i.e., the temperature in the discharge space falls below the temperature range in which the halogen cycle functions effectively). If the lighting power during low power lighting is greater than 85(%) of the rated power, the effect of improving the lamp properties (the interelectrode distance) is lost (i.e., the electrode material evaporates and a deposited portion is not formed on the electrode tips).

If the lighting power during high power lighting is less than 90(%) of the rated power, an appropriate protrusion cannot be formed on the electrode tips since the returned electrode material does not melt sufficiently, and therefore the electron emission spot or arc spot cannot be restored to the appropriate shape. If the lighting power during high power lighting is greater than 105(%) of the rated power, an appropriate protrusion cannot be formed on the electrode tips since the returned electrode material melt excessively, and therefore the electron emission spot or arc spot cannot be restored to the appropriate shape.

(3) Lighting Frequency

The lamp refresh processing of embodiment 1 involves alternately repeating low power lighting using a lighting frequency that is approximately 70(%) of the lighting frequency during rated power and high power lighting using the same lighting frequency as the lighting frequency during rated power lighting. However, in the lamp refresh processing of the present invention, the lighting frequency during low power lighting may be set in a range of 30(%) to 85(%) inclusive of the lighting frequency during rated power lighting, and the lighting frequency during high power lighting may be set in a range of 95(%) to 105(%) inclusive of the lighting frequency during rated power lighting.

If the lighting frequency during low power lighting is less than 30(%) of the lighting frequency during rated power lighting, the returned electrode material is deposited in a wide area of the electrode tips, and an appropriate protrusion cannot be formed on the electrodes tips during high power lighting. If the lighting frequency during low power lighting is greater than 85(%) of the lighting frequency during rated power lighting, the effect of improving the lamp properties (the interelectrode distance) is lost.

If the lighting frequency during high power lighting is less than 95(%) of the lighting frequency during rated power lighting, an appropriate protrusion cannot be formed on the electrode tips since the returned electrode material melts excessively, and therefore the electron emission spot or arc spot cannot be restored to the appropriate shape. If the lighting frequency during high power lighting is greater than 105(%) of the lighting frequency during rated power lighting, an appropriate protrusion cannot be formed on the electrode tips since the returned electrode material does not melt sufficiently, and therefore the electron emission spot or arc spot cannot be restored to the appropriate shape.

(4) Lighting Current Waveform

The lamp refresh processing of embodiment 1 involves alternately repeating low power lighting using an effective value that is approximately 135(%) of the effective value during rated power lighting and high power lighting using an effective value that is approximately 115(%) of the effective value during rated power lighting. However, in the lamp refresh processing of the present invention, the effective value during low power lighting may be set in a range of 100(%) to 200(%) inclusive of the effective value during rated power lighting, and the effective value during high power lighting may be set in a range of 100(%) to 150(%) inclusive of the effective value during rated power lighting.

The reasons for setting the effective value of the lighting current waveform in the above ranges are nearly the same as the reasons for the lighting power range. If the effective value during low power lighting is less than 100 (%) of the effective value during rated power lighting, the returned electrode material is deposited in a wide area of the electrode tips, and an appropriate protrusion cannot be formed on the electrodes tips during high power lighting. If the effective value during low power lighting is greater than 200(%) of the effective value during rated power lighting, the effect of improving the lamp properties (the interelectrode distance) is lost (i.e., the electrode material evaporates and a deposited portion is not formed on the electrode tips).

If the effective value during high power lighting is less than 100(%) of the effective value during rated power lighting, an appropriate protrusion cannot be formed on the electrode tips since the returned electrode material does not melt sufficiently, and therefore the electron emission spot or arc spot cannot be restored to the appropriate shape. If the effective value during high power lighting is greater than 150(%) of the effective value during rated power lighting, an appropriate protrusion cannot be formed on the electrode tips since the returned electrode material melts excessively, and therefore the electron emission spot or arc spot cannot be restored to the appropriate shape.

(5) Processing Time

As shown in FIG. 11, in the lamp refresh processing of embodiment 1, the low power lighting time (T1) is 8 minutes, and the high power lighting time (T2) is two minutes. However, the low power lighting time (T1) may be set in a range of 5 minutes to 60 minutes inclusive, and the high power lighting time (T2) may be set in a range of 5 seconds to 30 minutes inclusive.

If the low power lighting time is shorter than 5 minutes, the amount of electrode material that has returned to the electrodes is insufficient (the depositing of the electrode material is insufficient), and the lamp properties (the interelectrode distance) cannot be sufficiently restored. If the low power lighting time is longer than 60 minutes, too much electrode material returns (the depositing of the electrode material is excessive), and regeneration of the electrodes (formation of an appropriately-shaped protrusion on the electrode tips) by high power lighting becomes difficult.

If the high power lighting time is shorter than 5 seconds, the returned electrode material does not melt, and the electron emission spot or arc spot cannot be restored to the appropriate shape. If the high power lighting time is longer than 30 minutes, the returned electrode material melts excessively, and the electron emission spot or arc spot cannot be restored to the appropriate shape.

(6) Lighting Current Waveform Shape

As shown in FIG. 7, the shape of the lighting current waveform in embodiment 1 is a square waveform on which a saw-shaped waveform has been superposed. However, other shapes are also applicable.

Figure 22A:
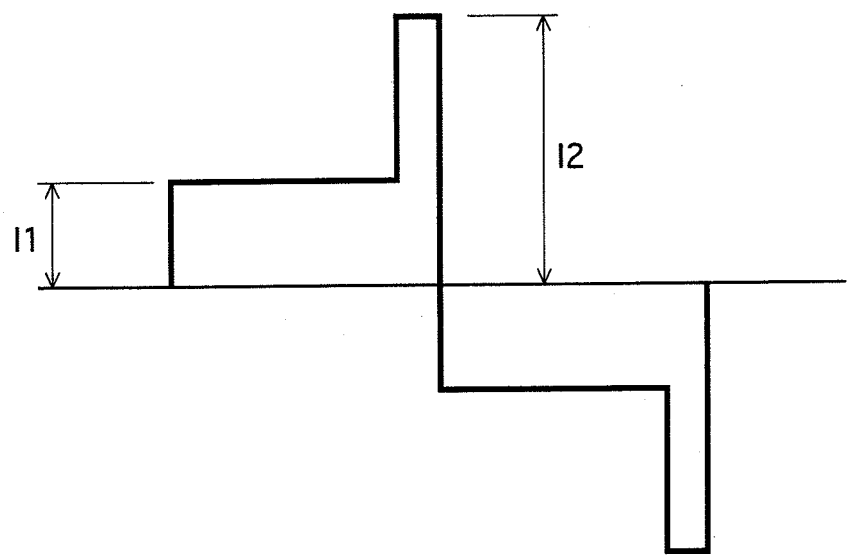
FIGS. 22A and 22B show exemplary shapes of lighting current waveforms.
Figure 22B:
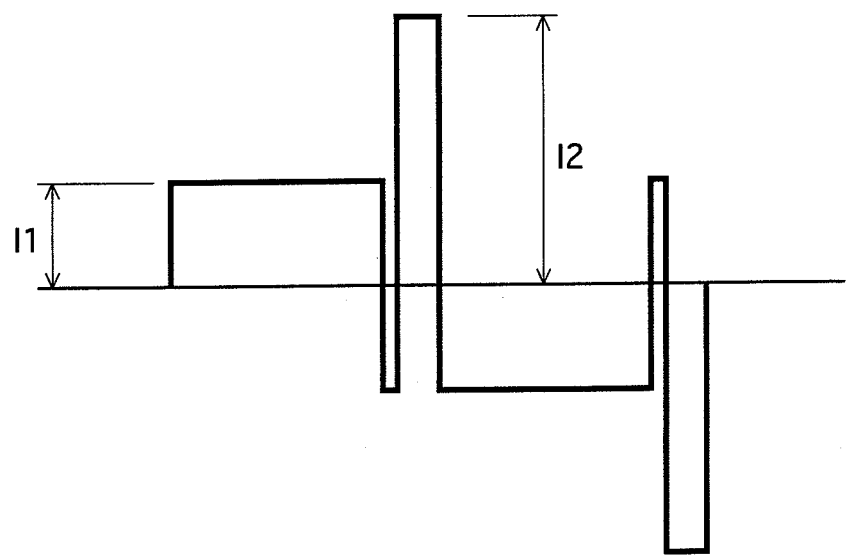

FIGS. 22A and 22B show exemplary lighting current waveform shapes.

For example, as shown in FIG. 22A, the lighting current waveform may be shaped as a square waveform on which a pulse waveform has been superposed. Or as shown in FIG. 22B, the lighting current waveform may be shaped as a square waveform on which an inverted pulse waveform has been superposed.

In other words, in addition to the above-described waveform and the waveforms described in the embodiment 1, the waveform may be any shape that has a current-change portion in which the flowing current has a higher value than the constant current value (effective value) in the square waveform. The inclusion of the current-change portion enables raising the electrode temperature before polarity inversion and restoring the electrode material that has been deposited on the electrodes to a shape close to the shape during the initial lighting stage.

The current-change portion may be a change in which the current value simply rises or simply falls, as shown in FIG. 7. Also, as shown in FIG. 22B, the current-change portion may be a change in which the current value is higher than the effective value after an inversion of the polarity of the current value, or in contrast to FIG. 22B, the current-change portion may be a change in which the polarity of the current value is inverted after the current value rises higher than the effective value.

(7) Judgment Reference

In the embodiments etc., the timing for performing lamp refresh processing is judged to be when the lamp voltage reaches a constant voltage value, or when the cumulative lighting time becomes predetermined times separated by a constant interval (an interval of 500 hours after 1,000 hours has passed).

However, the judgment reference pertaining to the lamp voltage does not need to be constant. Instead, the judgment reference may change according to the number of times that lamp refresh processing has been performed, or the interval between performing lamp refresh processing may gradually become shorter according to the length of the cumulative lighting time.

(8) Other Remarks

In the embodiments etc., the lighting parameters for lamp refresh processing (i.e., the lighting parameter values for normal lighting and the lighting parameter values for lamp refresh lighting) change by a constant ratio. However, the lighting parameters for lamp refresh processing do not need to change by a constant ratio.

Specifically, the lighting parameter for lamp refresh processing may be changed to conform to changes over time in the lamp properties such as the lamp voltage, lamp current, brightness, and illuminance.

Figure 23:
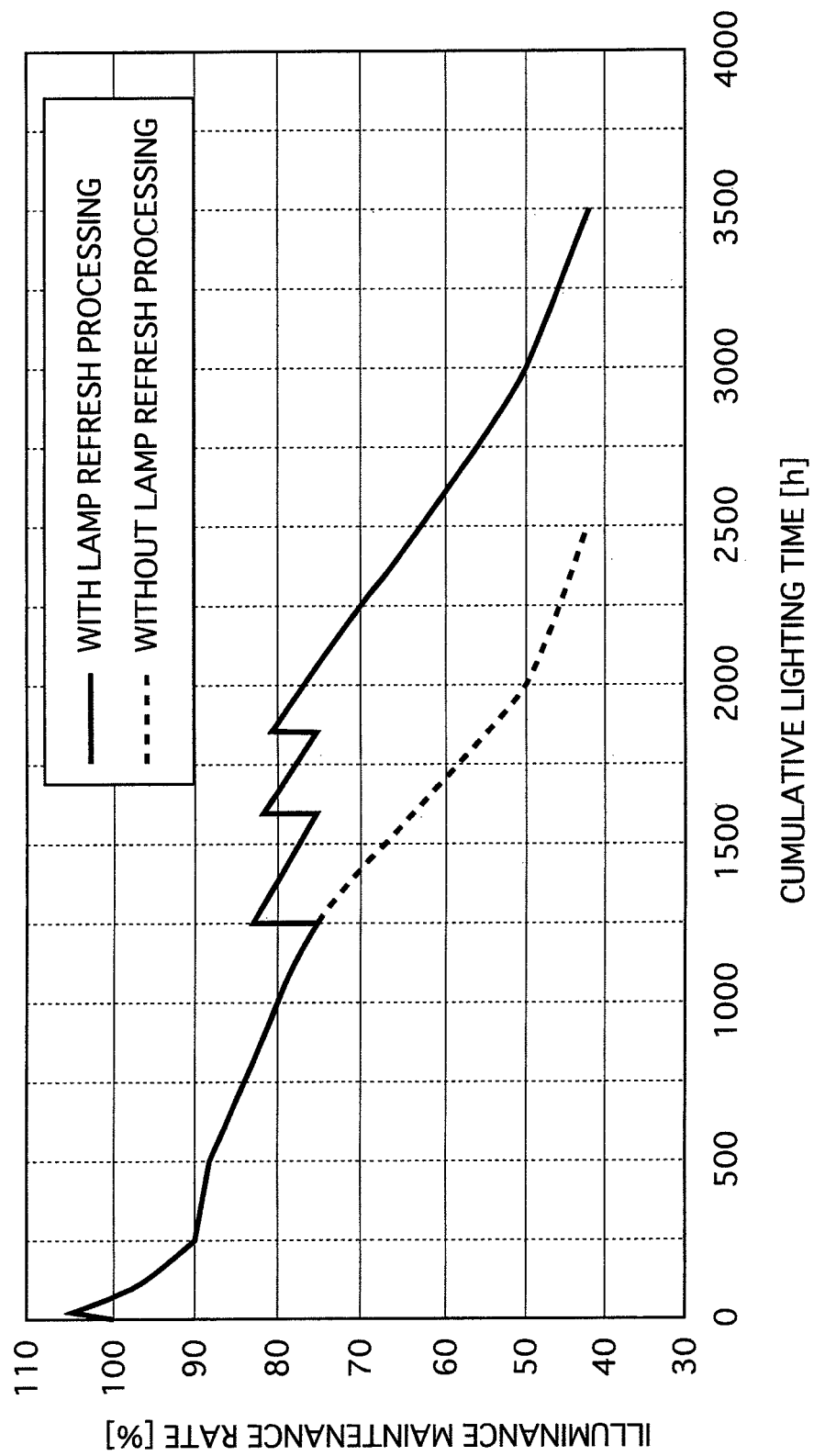
FIG. 23 shows results of a comparative test in which an illuminance property is used as a reference.
Figure 24:
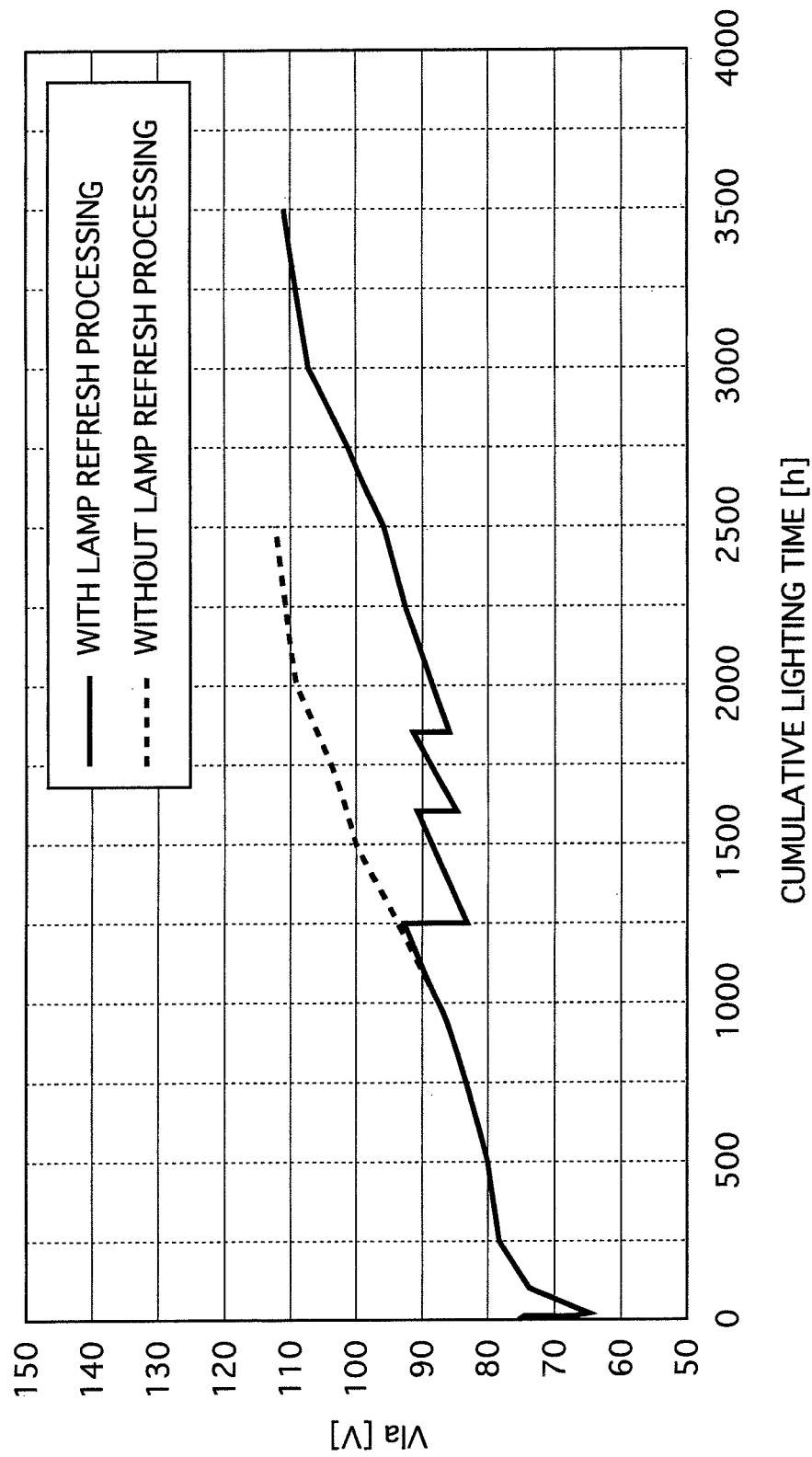
FIG. 24 shows results of a comparative test in which an illuminance property is used as a reference.

FIG. 23 and FIG. 24 show results of a comparative test in the case of using the illuminance property as a reference.

Note that in FIGS. 23 and 24, the solid lines show results in a case of performing refreshing processing, and the broken lines show results in a case of not performing refreshing processing at all. Also, lamp refresh processing was performed three times.

In the present test, the lamps were the same as the lamp used in the comparative test in embodiment 1, and the lighting method was the same as used in the comparative test of embodiment 1 (i.e., the control patterns shown in FIG. 11 were used).

Although the lamp voltage is used as a reference for judging whether to perform lamp refresh processing in embodiment 1, the illuminance maintenance rate is used as the judgment reference here. Specifically, the illuminance of the lamp is measured, and the lamp refresh processing is performed if the measured illuminance becomes 75(%) of a reference illuminance, which is the initial illuminance of the lamp (during design) (It goes without saying that in this case, a sensor is provided for measuring illuminance.).

As shown in FIG. 23, in the present test, lamp refresh processing is performed when the illuminance maintenance rate of the lamp becomes 75(%).

Similarly to embodiment 1, FIG. 24 shows that in the lighting method in which lamp refresh processing was not performed at all, the lamp voltage Vla simply rises as the cumulative lighting time increases. However, in the case of performing lamp refresh processing when the illuminance maintenance rate is 75(%), the lamp voltage Vla fell after performing lamp refresh processing each time.

FIG. 23 shows that in the lighting method in which lamp refresh processing is not performed at all, the average illuminance maintenance rate (%) reached 50(%) when the cumulative lighting time reached approximately 2,000 hours. However, in the case of performing lamp refresh processing, the average illuminance maintenance rate (%) reached 50(%) when the cumulative lighting time reached approximately 3,000 hours.

These results show that even in the case of using the illuminance maintenance rate instead of the lamp voltage as the reference for judging whether to perform lamp refresh processing in the case of using the lamp and lighting method described in embodiment 1, the lamp refresh processing of the present invention is effective in extending the time until the illuminance maintenance rate reaches 50(%) (i.e., the time until the lifetime is reached). Also, it can be inferred that using the illuminance maintenance rate as the judgment reference can be applied to projection-type image display apparatuses (lighting methods) that use various high pressure discharge lamps, regardless of their rated lamp power.

Note that performing property improvement processing by changing the lighting power and frequency facilitates the return of the electrode material to the electrodes, that is to say, facilitates the depositing of the electrode material on the electrodes. On the other hand, performing property improvement processing by changing the lighting power and lighting current waveform facilitates local (pinpoint) depositing of the electrode material on the electrode tip portions.

3. Projection-Type Image Display Apparatus (1) Display Apparatus

Embodiment 1 describes a front projection-type image display apparatus as an example of an image display apparatus including a lamp. However, the present invention can be worked in, for example, a rear projection-type image display apparatus as well.

Figure 25:
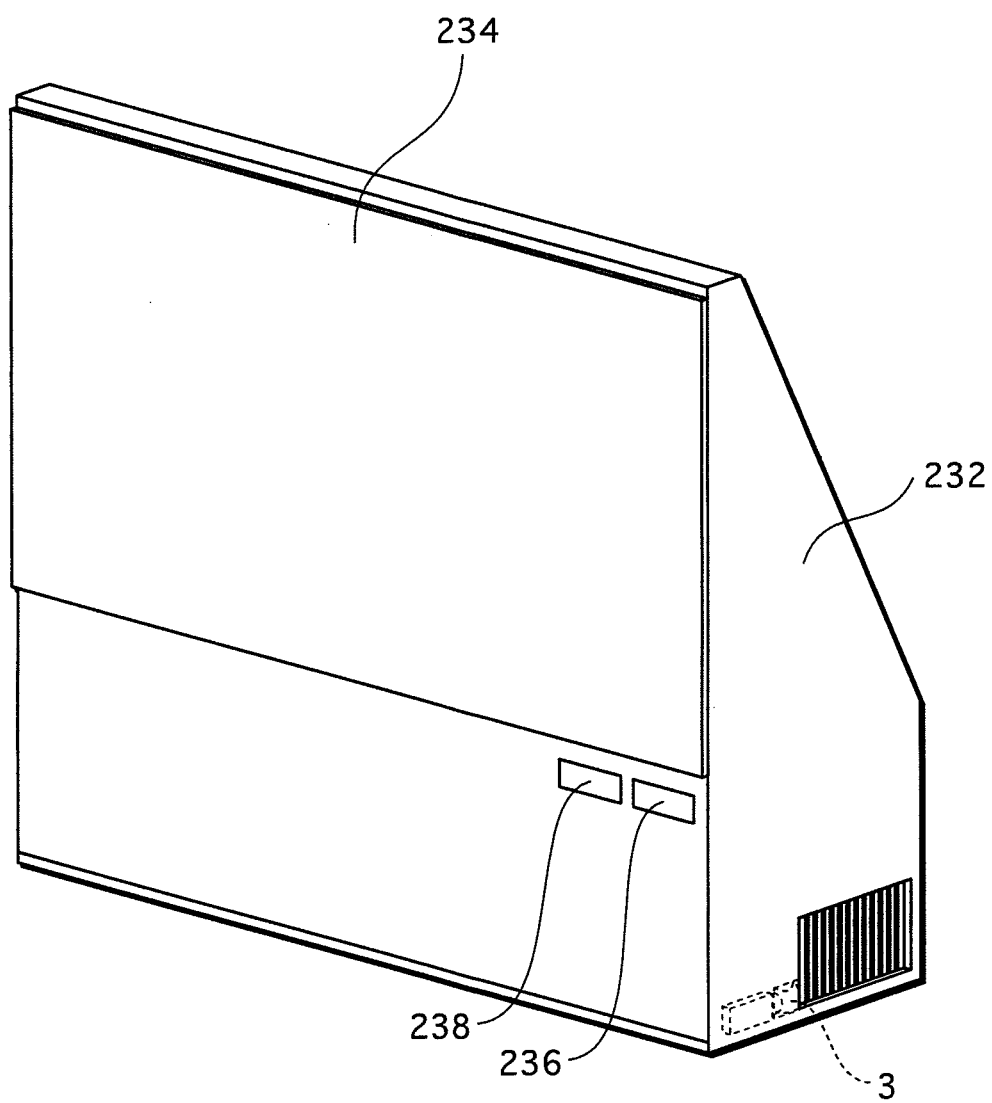
FIG. 25 is an overall perspective view of a rear projection-type image display apparatus pertaining to a modification.

FIG. 25 is an overall perspective view of a rear projection-type image display apparatus pertaining to the present modification.

A rear projection-type projector 230 includes a screen 234 for displaying images etc. on a front wall of a cabinet 232. The rear projection-type projector 230 also includes a lamp unit 3, a control unit 5, a lighting apparatus 7, etc. in the cabinet 232.

The rear projection-type projector 230 also includes a display unit 236 for alerting the user that the timing for performing lamp refresh processing has been reached, and an operation unit 238 by which the user performs an operation to instruct lamp refresh processing to be performed. The display unit 236 and the operation unit 238 are located below the lower right corner of the screen 234.

Also, although the embodiments describe a projection-type image display apparatus that includes an LCD as a video display element, the present invention can be worked in a projection-type image display apparatus that includes, for example, an LCOS or a DLP.

(2) Lighting Apparatus etc.

Furthermore, although the alert unit and reception unit are controlled by the control unit in the embodiments etc., for example, the lighting control unit of the lighting apparatus may control the alert unit and reception unit.

Also, the present invention can be applied to any lighting apparatus that lights a high pressure discharge lamp at rated power. Examples include a lighting apparatus for lighting a high pressure discharge lamp that is a lighting source in a projection-type image display apparatus, and a lighting apparatus for lighting a high pressure discharge lamp used for illumination in a store or outdoors.

In the embodiments, the alert unit is an LED or the like that is lit to alert the user that the timing for performing lamp refresh processing has been reached. However, the alert may be made by a different method.

Examples of other methods for making the alert include a warning unit that emits a warning sound (may be an announcement etc.), and an image display unit that displays an image including characters etc. Furthermore, the alert may be made by displaying a notification that the timing for executing lamp refresh processing has arrived on the screen for displaying video.

In the embodiments etc., the reception unit receives an execution instruction from the user when, for example, the user presses an operation button to instruct the execution of the lamp refresh processing. However, the execution instruction may be received by another method.

Examples of other methods for receiving the execution instruction include receiving the user instruction when the user performs a predetermined operation on a remote control etc. for the image display apparatus, and a touch panel in which the alert unit and reception unit are both integrated.

4. Other Remarks

The above embodiments and modifications are merely examples of the present invention, and it goes without saying that the present invention also includes appropriate combinations of the embodiments and examples.

INDUSTRIAL APPLICABILITY

In a projection-type image display apparatus of the present invention that includes a high pressure discharge lamp utilizing the halogen cycle as a light source, performing lamp properties improvement processing can restore lamp properties such as interelectrode distance, brightness, and lamp voltage, and can increase lamp lifetime.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A projection-type image display apparatus that uses a high pressure discharge lamp, which utilizes a halogen cycle, as a light source by lighting the high pressure discharge lamp at one of a rated power and a power that is lower than the rated power, the projection-type image display apparatus comprising:
   a processing unit to temporarily execute property improvement processing that improves a lamp property while the high pressure discharge lamp is being lit;
   a reception unit configured to receive an instruction from a user to execute the property improvement processing; and
   a control unit configured when the reception unit has received the user instruction, to execute the property improvement processing by instructing the processing unit to execute the property improvement processing, wherein said temporary time is between 5 and 60 minutes, wherein
   the property improvement processing includes:
   processing for performing low power lighting of the high pressure discharge lamp by temporarily changing the lighting power of the high pressure discharge lamp to a first value that is lower than the rated power;
   processing for, after performing the low power lighting, performing high power lighting of the high pressure discharge lamp by temporarily changing the lighting power of the high pressure discharge lamp to a second value that is higher than the lighting power during the low power lighting; and
   processing for temporarily changing at least one of a lighting frequency and a lighting waveform while performing the low power lighting and the high power lighting,
   in the low power lighting, temporarily changing the lighting frequency involves changing the lighting frequency of the high pressure discharge lamp to a value that is less than or equal to the lighting frequency being used in rated power lighting, and temporarily changing the lighting waveform involves changing the lighting waveform of the high pressure discharge lamp to a value that is greater than or equal to the lighting waveform being used in the rated power lighting, and
   in the high power lighting, temporarily changing the lighting frequency involves changing the lighting frequency of the high pressure discharge lamp to a value that is greater than or equal to the changed lighting frequency being used in the low power lighting, and temporarily changing the lighting waveform involves changing the lighting waveform of the high pressure discharge lamp to a value that is less than or equal to the changed lighting waveform being used in the low power lighting.

2. The projection-type image display apparatus of claim 1, wherein
   the lamp property degrades over time,
   the projection-type image display apparatus further comprises:
   a judgment unit to judge whether a timing for improving the degraded lamp property has arrived; and
   an alert unit operable to, if the timing for improving the degraded lamp property has arrived, make an alert by the display apparatus to the user that the lamp property should be improved, and
   when the reception unit has received the user instruction after the alert unit has made the alert to the user, the control unit instructs the processing unit to execute the property improvement processing in order to improve the degraded lamp property.

3. The projection-type image display apparatus of claim 1, wherein
   in the property improvement processing, the processing for performing the low power lighting and high power lighting is performed one or more times.

4. The projection-type image display apparatus of claim 1, wherein
   in the property improvement processing, an amount by which the lighting power is changed differs according to a change over time in the lamp property of the high pressure discharge lamp.

5. The projection-type image display apparatus of claim 4, wherein
   the amount by which the lighting power is changed differs according to a change in an illuminance of the high pressure discharge lamp.

6. The projection-type image display apparatus of claim 1, wherein in the low power lighting, the lighting power is changed to a value that is 85% or less of the rated power, and in the high power lighting, the lighting power is changed to a value that is in a range of 90% to 100% inclusive of the rated power.

7. A lighting apparatus that lights, a high pressure discharge lamp, which utilizes a halogen cycle, at one of a rated power and a power that is lower than the rated power, the lighting apparatus comprising:
 a processing unit to temporarily execute property improvement processing that improves a lamp property while the high pressure discharge lamp is being lit;
 a reception unit configured to receive, an instruction from a user to initiate and execute the property improvement processing; and
 a control unit configured when the reception unit has received the user instruction, to execute the property improvement processing by instructing the processing unit to execute the property improvement processing, wherein said temporary time period is between 5 and 60 minutes, wherein
 the property improvement processing includes:
 processing for performing low power lighting of the high pressure discharge lamp by temporarily changing the lighting power of the high pressure discharge lamp to a first value that is lower than the rated power;
 processing for, after performing the low power lighting, performing high power lighting of the high pressure discharge lamp by temporarily changing the lighting power of the high pressure discharge lamp to a second value that is higher than the lighting power during the low power lighting; and
 processing for temporarily changing at least one of a lighting frequency and a lighting waveform while performing the low power lighting and the high power lighting,
 in the low power lighting, temporarily changing the lighting frequency involves changing the lighting frequency of the high pressure discharge lamp to a value that is less than or equal to the lighting frequency being used in rated power lighting, and temporarily changing the lighting waveform involves changing the lighting waveform of the high pressure discharge lamp to a value that is greater than or equal to the lighting waveform being used in the rated power lighting, and
 in the high power lighting, temporarily changing the lighting frequency involves changing the lighting frequency of the high pressure discharge lamp to a value that is greater than or equal to the changed lighting frequency being used in the low power lighting, and temporarily changing the lighting waveform involves changing the lighting waveform of the high pressure discharge lamp to a value that is less than or equal to the changed lighting waveform being used in the low power lighting.

8. The lighting apparatus of claim 7, wherein the lamp property degrades over time, the lighting apparatus further comprises:
 a judgment unit to judge whether a timing for improving the degraded lamp property has arrived; and
 an alert unit to, if the timing for improving the degraded lamp property has arrived, make an alert to the user that the lamp property should be improved, and
 when the reception unit has received the instruction, from the user, after the alert unit has made the alert to the user, the control unit instructs the processing unit to execute the property improvement processing in order to improve the degraded lamp property.

9. A lighting method for lighting a high pressure discharge lamp, which utilizes a halogen cycle, at one of a rated power and a power that is lower than the rated power, comprising the steps of:
 judging whether a timing for improving a lamp property has arrived;
 making an alert, to a user, that the lamp property should be improved, if the timing for improving the degraded lamp property has arrived;
 receiving an instruction, from the user, to improve the lamp property; and
 if the user instruction to improve the lamp property has been received after the alert has been made to the user, executing property improvement processing that improves the lamp property while the high pressure discharge lamp is being lit, in order to improve the degraded lamp property, wherein the time period for executing the lamp property improvement is within a range of 5 to 60 minutes, wherein
 the property improvement processing includes a control unit configured to execute instructions to enable:
 processing for performing low power lighting of the high pressure discharge lamp by temporarily changing the lighting power of the high pressure discharge lamp to a first value that is lower than the rated power;
 processing for, after performing the low power lighting, performing high power lighting of the high pressure discharge lamp by temporarily changing the lighting power of the high pressure discharge lamp to a second value that is higher than the lighting power during the low power lighting; and
 processing for temporarily changing at least one of a lighting frequency and a lighting waveform while performing the low power lighting and the high power lighting,
 in the low power lighting, temporarily changing the lighting frequency involves changing the lighting frequency of the high pressure discharge lamp to a value that is less than or equal to the lighting frequency being used in rated power lighting, and temporarily changing the lighting waveform involves changing the lighting waveform of the high pressure discharge lamp to a value that is greater than or equal to the lighting waveform being used in the rated power lighting, and
 in the high power lighting, temporarily changing the lighting frequency involves changing the lighting frequency of the high pressure discharge lamp to a value that is greater than or equal to the changed lighting frequency being used in the low power lighting, and temporarily changing the lighting waveform involves changing the lighting waveform of the high pressure discharge lamp to a value that is less than or equal to the changed lighting waveform being used in the low power lighting.

10. The lighting method of claim 9, wherein
 the property improvement processing for performing the low power lighting and high power lighting is performed a plurality of times over a rated life cycle of the high pressure lamp.

11. The lighting method of claim 9, wherein in the low power lighting, the lighting power is changed to a value that is 85% or less of the rated power, and in the high power lighting, the lighting power is changed to a value that is in a range of 90% to 100% inclusive of the rated power.

* * * * *